United States Patent
Munoz et al.

(10) Patent No.: US 10,956,476 B2
(45) Date of Patent: Mar. 23, 2021

(54) ENTROPIC CLASSIFICATION OF OBJECTS

(71) Applicant: Intel Corporation, Santa Clara, CA (US)

(72) Inventors: Jorge A. Munoz, Beaverton, OR (US); James Asoka Diggs, Aloha, OR (US); John David Miller, Portland, OR (US); Vikas Sharma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 16/083,108

(22) PCT Filed: Apr. 1, 2016

(86) PCT No.: PCT/US2016/025466
§ 371 (c)(1),
(2) Date: Sep. 7, 2018

(87) PCT Pub. No.: WO2017/171826
PCT Pub. Date: Oct. 5, 2017

(65) Prior Publication Data
US 2019/0080000 A1    Mar. 14, 2019

(51) Int. Cl.
*G06F 16/00* (2019.01)
*G06F 16/35* (2019.01)
(Continued)

(52) U.S. Cl.
CPC .............. *G06F 16/35* (2019.01); *G06F 15/16* (2013.01); *G06F 16/00* (2019.01); *G06F 16/93* (2019.01);
(Continued)

(58) Field of Classification Search
CPC .......... G06F 16/35; G06F 16/93; G06F 16/00; G06F 15/16; G06F 17/11; G06F 21/552; G06F 2216/11; G06N 20/00; G06N 5/022; G06K 9/00469; G06K 9/6267; G06Q 10/1053
See application file for complete search history.

(56) References Cited

U.S. PATENT DOCUMENTS

| 6,397,205 | B1 * | 5/2002 | Juola ........................ G06F 16/35 |
| 7,320,000 | B2 * | 1/2008 | Chitrapura .............. G06F 16/00 |

(Continued)

OTHER PUBLICATIONS

EPO; Extended European Search Report issued in EP Patent Application No. 16897366.7, dated Oct. 14, 2019; 10 pages.
(Continued)

*Primary Examiner* — Jared M Bibbee
(74) *Attorney, Agent, or Firm* — Alliance IP, LLC

(57) ABSTRACT

There is disclosed in an example a computing apparatus for assigning an entropy score to a document to be added to a corpus in a first temporal state having a first corpus entropy, having one or more logic elements, including at least one hardware logic element, providing a classification engine to: receive the document to be added to the corpus; add the document to the corpus, creating a second temporal state of the corpus; compute a second corpus entropy for the second temporal state, based at least in part on a morphism; and assign the document a gentropy score based at least in part on a difference between the first corpus entropy and the second corpus entropy.

22 Claims, 20 Drawing Sheets

(51) Int. Cl.

| | | |
|---|---|---|
| *G06F 16/93* | (2019.01) | |
| *G06F 15/16* | (2006.01) | |
| *G06N 5/02* | (2006.01) | |
| *G06N 20/00* | (2019.01) | |
| *G06F 21/55* | (2013.01) | |
| *G06F 17/11* | (2006.01) | |
| *G06K 9/00* | (2006.01) | |
| *G06K 9/62* | (2006.01) | |
| *G06Q 10/10* | (2012.01) | |

(52) U.S. Cl.
CPC ............ *G06F 17/11* (2013.01); *G06F 21/552* (2013.01); *G06K 9/00469* (2013.01); *G06K 9/6267* (2013.01); *G06N 5/022* (2013.01); *G06N 20/00* (2019.01); *G06Q 10/1053* (2013.01); *G06F 2216/11* (2013.01)

(56) References Cited

U.S. PATENT DOCUMENTS

| | | | | |
|---|---|---|---|---|
| 8,166,051 | B1* | 4/2012 | Bauer | G06F 16/319 707/750 |
| 2003/0221163 | A1* | 11/2003 | Glover | G06F 16/951 715/205 |
| 2008/0249999 | A1 | 10/2008 | Renders et al. | |
| 2011/0270845 | A1 | 11/2011 | Lin et al. | |
| 2015/0348216 | A1 | 12/2015 | Gustafson et al. | |
| 2016/0307113 | A1* | 10/2016 | Calapodescu | G06N 20/00 |
| 2017/0083507 | A1* | 3/2017 | Ho | G06F 16/3344 |

OTHER PUBLICATIONS

Krishnapuram, Raghu, et al.; "Classification of Text Documents Based on Minimum System Entropy," Proceedings of the 20th International Conference on Machine Learning; Washington D.C., USA; Aug. 24, 2003; 8 pages.
International Search Report for PCT Application No. PCT/US2016/025466 dated Dec. 23, 2016, 3 pages.
Korkontzelos, Ioannis, et al., "Graph Connectivity Measures for Unsupervised Parameter Tuning of Graph-based Sense Induction System", In: Proceedings of the NAACL HLT Workshop on Unsupervised and Minimally Supervised Learning of Lexical Semantics, Jun. 2009, pp. 36-44.
Navigli, Roberto, et al., "An Experimental Study of Graph Connectivity for Unsupervised Word Sense Disambiguation", In: IEEE Transactions on Pattern Analysis and Machine Intelligence, Feb. 13, 2010, vol. 32, pp. 678-692.
Written Opinion of the International Searching Authority for PCT Application No. PCT/US2016/025466, dated Dec. 23, 2016, 5 pages.
PCT International Preliminary Report on Patentability issued for PCT/US2016/025466, dated Oct. 2, 2018; 7 pages.

* cited by examiner

*Fig. 5*

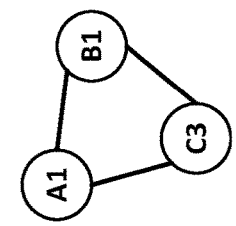
DOCUMENT 3
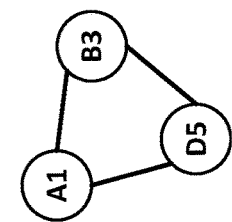
DOCUMENT 2
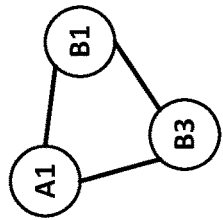
DOCUMENT 1
MESSAGE GRAPH OF DOCUMENT
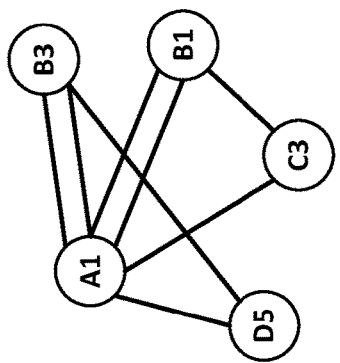
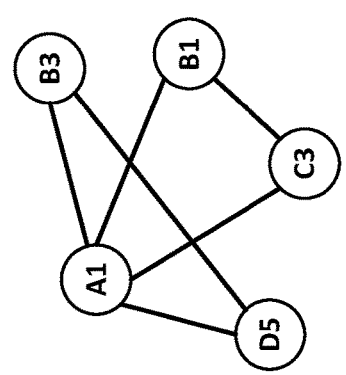
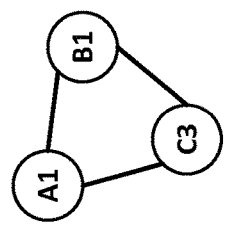
MESSAGE GRAPH OF CORPUS
*Fig. 11*

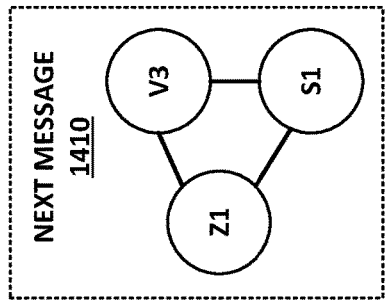
NEXT MESSAGE
1410
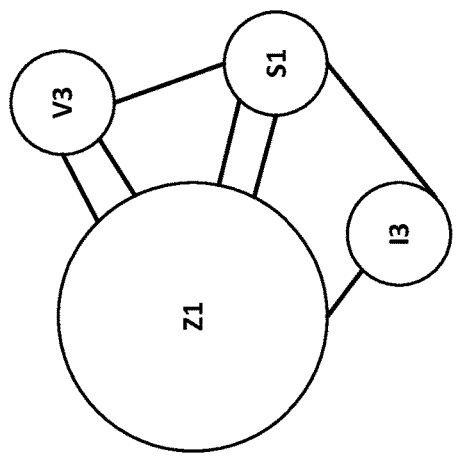
ORIGINAL GRAPH
1400
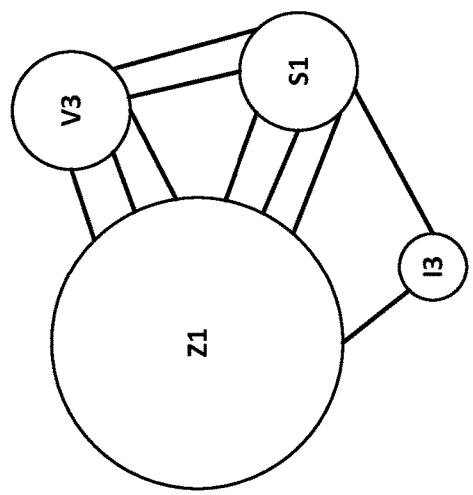
UPDATED GRAPH
1402
Fig. 14

COMPARISON OF LABELED DATA

ENTROPIC CLASSIFICATION OF OBJECTS

CROSS-REFERENCE TO RELATED APPLICATIONS

This application is a national stage application under 35 U.S.C. § 371 of PCT International Application Serial No. PCT/US2016/025466, filed on Apr. 1, 2016, and entitled ENTROPIC CLASSIFICATION OF OBJECTS. The disclosure of the prior application is considered part of and is hereby incorporated by reference in its entirety in the disclosure of this application.

FIELD OF THE SPECIFICATION

This disclosure relates in general to the field of machine learning, and more particularly, though not exclusively to, a system and method for providing entropic classification of objects.

BACKGROUND

Machine-driven classification of objects, such as web pages, text documents, or multimedia content, is useful in contexts such as security and productivity.

Classifiers are a category of tool in the analytics arsenal that help divide input data into one or more classes. For example, email spam filter classifiers decide what incoming email is classified as "spam" and what is classified as "ham." A classifier with a binary result ("yes," the object is in the target class, or "no," the object is not in the target class) may be referred to as a binary classifier. A classifier that designates an object as belonging to one of several potential classes may be referred to as a multinominal classifier.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 5 is an illustration of analysis of an issued patent according to one or more examples of the present specification.

FIG. 11 is an illustration of evolution of a message graph according to one or more examples of the present specification.

FIG. 14 is an illustration of evolution of a message graph according to one or more examples of the present specification FIG. 15 a graph of a distribution of gentropy scores according to one or more examples of the present specification

SUMMARY

Figure 1:
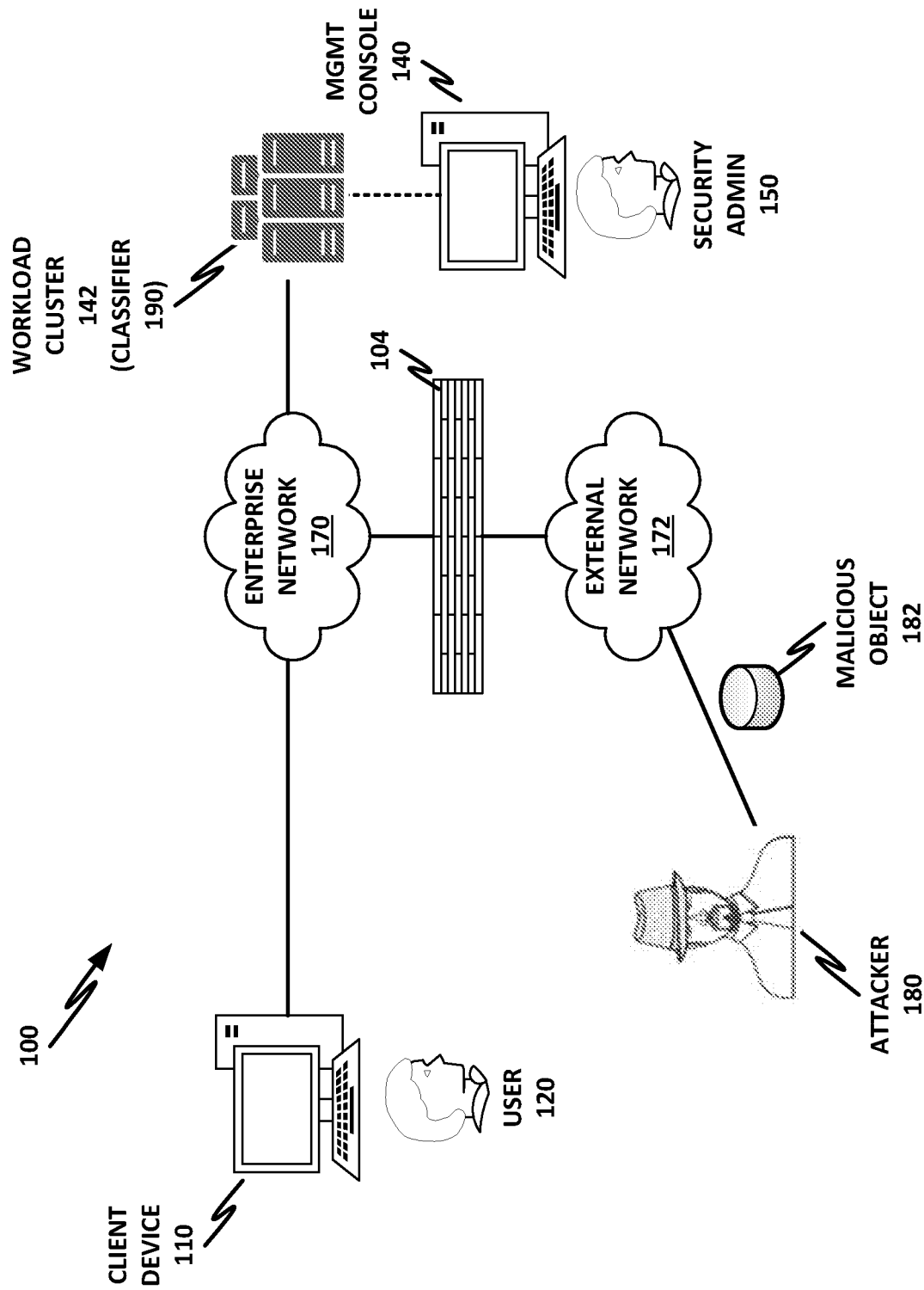
FIG. 1 is a block diagram of a security-enabled network according to one or more examples of the present specification.

There is disclosed in an example a computing apparatus for assigning an entropy score to a document to be added to a corpus in a first temporal state having a first corpus entropy, having one or more logic elements, including at least one hardware logic element, providing a classification engine to: receive the document to be added to the corpus; add the document to the corpus, creating a second temporal state of the corpus; compute a second corpus entropy for the second temporal state, based at least in part on a morphism; and assign the document a gentropy score based at least in part on a difference between the first corpus entropy and the second corpus entropy.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Classification of documents and other objects is an important task for an enterprise. Such classification can have uses for security, privacy, litigation, and many other purposes.

In one nonlimiting example, an enterprise may have firewall rules configured to treat certain classes of websites differently. Business-essential websites (such as corporate websites, business information, partner sites, and similar) may be always allowed. Non-essential but harmless websites (such as news, general information, and e-commerce) may be allowed but logged. Time-wasting websites (such as sports, games, most social media, fashion, or other non-business-related subject matters) may be allowed only with explicit user input. Malicious websites (such as malware, or websites with illegal or unethical content) may be blocked and permissible only with special administrative dispensation.

Because there are many millions of websites, it may be impractical to have a human user manually classify each website. Rather, one or more machine classifiers may be employed to classify each website, and then permissions may be applied en grosse to each class. Thus, machine learning can be used to help deploy and enforce enterprise security and usage policies.

Similarly, a machine classifier may be used to assign ownership or other attributes to business documents. For example, an enterprise may deploy a database file system, in which files must be assigned attributes, such as which group owns each document, which client or job number a document belongs to, or similar attributes. The classifier may use existing metadata fields, file locations, and content to assign these attributes (each constituting a "class") to each document.

In some cases, classification is mutually exclusive. For example, when assigning ownership to a document, enterprise constraints may dictate that only one group can own the document. Thus, the classes are mutually exclusive (e.g., the owner can be either "Business" or "Marketing," but not both). In other cases, classes may be more analogous to "tags," and thus may be non-exclusive. For example, a popular sports website that also frequently features scantily-clad women and men in skimpy swimsuits, may be tagged as both "sports" and "soft pornography." In the latter case, the site may inherit the permission set of its most-restricted tag.

In another example, machine classification may be used to mitigate the expense of electronic production for litigation. A binary classifier may scan a large corpus of documents, and tag each one as "relevant" or "not relevant" to the litigation. Additional classifiers may be used, for example, to tag documents as "privileged," "attorneys' eyes only," or as potential trial exhibits. Even if a human user is required to verify the classifications, having the initial tagging in place can significantly speed the process.

Embodiments of the present specification deal with the problem of information overload, which occurs when the amount of input to a system exceeds its processing capacity. For example, a web search might find millions of relevant results, or there might be tens of thousands of relevant technical articles in a given field. In those cases, it is implausible for a cognitive observer to review all the available data and to choose a best fit.

In the field of web searches, first-generation search engines such as the "World Wide Web Worm" relied on raw keyword matching to find information, but they typically returned too many low quality matches to be very useful to general users. Later, Google combined keyword matching with the "PageRank" algorithm, which ranks websites, inter alia based on the number of links to and from the page. These improvements in ranking results have resulted in significantly better results returned to users, though this approach is still limited by the user's knowledge of the appropriate keywords to use.

In the field of "recommenders," a recommendation engine may at least partially offset the limitations of keyword searching. Recommendation engines are used by services like Pandora, last.fm, Google Music, Netflix, Youtube, Vimeo, and many others to recommend media such as movies, music, and books based on the user's previous selections and the selections of users with similar profiles, and stated preferences. But even these systems, like keyword-based search systems, may lack information diversity in certain embodiments. This can become particularly important when the elements being searched contain highly redundant information. Taking search results as an example, higher diversity of returned results allows the system to present a wider span of information in the first few hits, or for recommender systems to present a broader selection of recommendations, some of them even surprising to the user but still useful.

Thus, embodiments of the methods described in this specification can be used to rank a collection of items according to how similar or dissimilar they are compared to an existing collection, based at least in part on one or more morphisms, or a combination of morphisms. Morphisms are physical or conceptual relationship schemes between attributes of the items or the items themselves. In information theory, these items, their attributes, or their relationships could be thought of as the result of a transmitter operating on a message.

Throughout this specification, each object or item in the data set is called a "document." However, the term "document" should not be misconstrued to be limited merely to discrete units of paginated textual data. Rather, it is a message produced by an information source (from an information theoretic point of view). A document in this context includes any object or datum that may be represented or modeled digitally, including its attributes and metadata where appropriate. Thus, "documents" may be text documents, web pages, books, movies, music tracks, sounds, periodicals, articles, businesses, stocks, living organism (plants, animals, or people), network objects, network addresses, users of a network, executable files, astronomical objects, weather events, or weather patterns, to name just a few nonlimiting examples.

A collection of documents being managed by the system may be referred to as the "corpus." In an initial "null corpus" state, the corpus has zero documents. When the first document is added to the corpus (including any characterization or classification performed on the document), the corpus enters a second state. Thereafter, with the addition of each new document or group of documents, the corpus moves into a new state. With each state, the corpus may have a total information entropy H, the computation of which is detailed below. The total information entropy of a particular state may be notated as $H_n$, where n is the state number. Furthermore, with the addition of each new document, a change in information entropy occurs. The change in information entropy caused by the addition of a new document d to the corpus may be represented as $S_d$.

In evaluating the corpus, it is straightforward to include user rankings or multiple scoring criteria. The methods of the present specification may be used to identify items that a user will likely find useful, either because they are representative of the collection (e.g., exemplars), or because they are unusual combinations (e.g., outliers). Depending on the use case, identifying exemplars may be most desirable (e.g., review articles, where exemplars may represent the best summarizations of field), or identifying outliers may be most desirable (e.g., network security, where outliers may represent a security risk).

A system of the present specification may quantitatively measure the graph entropy (the "gentropy") of a mathematical graph where the nodes and edges are assigned according to a particular morphism or combination of morphisms and based on the documents of a corpus, and thus be able to calculate the change in gentropy due to actual or potential new additions. The graph such constructed is a "message graph" since in an information theoretic framework, the information contained in each relationship between attributes is a message. In the same framework, a morphism is akin to a receiver that reconstructs certain aspects of the message. One interpretation of the gentropy is as a measure of diversity. For example, in ecology, ecosystems with more animal species and about the same number of animals belonging to each species are more diverse than ecosystems with fewer species or those in which most animals belong to a few species.

In appropriate embodiments, the value of $S_d$ may be conditioned to account for corpus size. In other words, in a corpus of three documents, the addition of a fourth document may be expected to have a very substantial effect on the overall entropy of the corpus, not because the document is very significant, but because the corpus is quite small. On the other hand, in a corpus of one million documents, the addition of a one-million-and-first document will be expected to have only a small effect on the total entropy, not because the document is unimportant, but because the corpus is very large. Additionally, certain attribute relationships might be more important that others. Thus, there are also disclosed herein methods for conditioning the value of $S_d$ to more accurately reflect the importance of a particular document to the corpus. The "gentropy score" $G_d$ of document d is its conditioned $S_d$. The methods disclosed herein may be applied in a variety of cases, and may be used to predict items that a user will find the most interesting from a large corpus.

In certain embodiments, different rules may be designed for different purposes, and then combined. For example, it is observed herein that documents considered interesting by subject matter experts tended to significantly increase the information entropy (they were unusual), or to significantly decrease it (they were strongly representative of the collection).

One application of the present method is to aid in the identification of technical documents that a user might find interesting. This use case is not intended to be limiting, but was used as a validation test of the model disclosed herein. In the test case, document metadata (i.e., not document content) were used to flag potentially relevant materials from a large collection of similar documents. This test case illustrates an advantage of the present method, because neither keywords (as used by a search engine), nor past user behavior or preferences (as used by recommendation engines) are necessary, though keywords and past behavior can be integrated with the present methods in appropriate embodiments.

The test implementation was based on classification of contents, and was intended to identify items similar to the collection, as well as items that are unusual but still relevant. The disclosed method was used to score each item in a collection of about 14,000 technical documents belonging broadly to the same industry and published periodically since 1976. The gentropy score for each document measured the technological diversity of each document with respect to the rest of the documents published up to that point, and is based on a classification assigned to it upon publication.

The classification scheme in this case is a human-created taxonomy with several thousand unique categories. A publicly-available publication, generally considered reputable, and maintained by a group of domain experts was consulted. The experts who maintain the website read newly-published documents in a particular industry, and provide a digest with commentary. They publish additional commentary about documents that may be of particular interests to industry groups.

Figure 16:
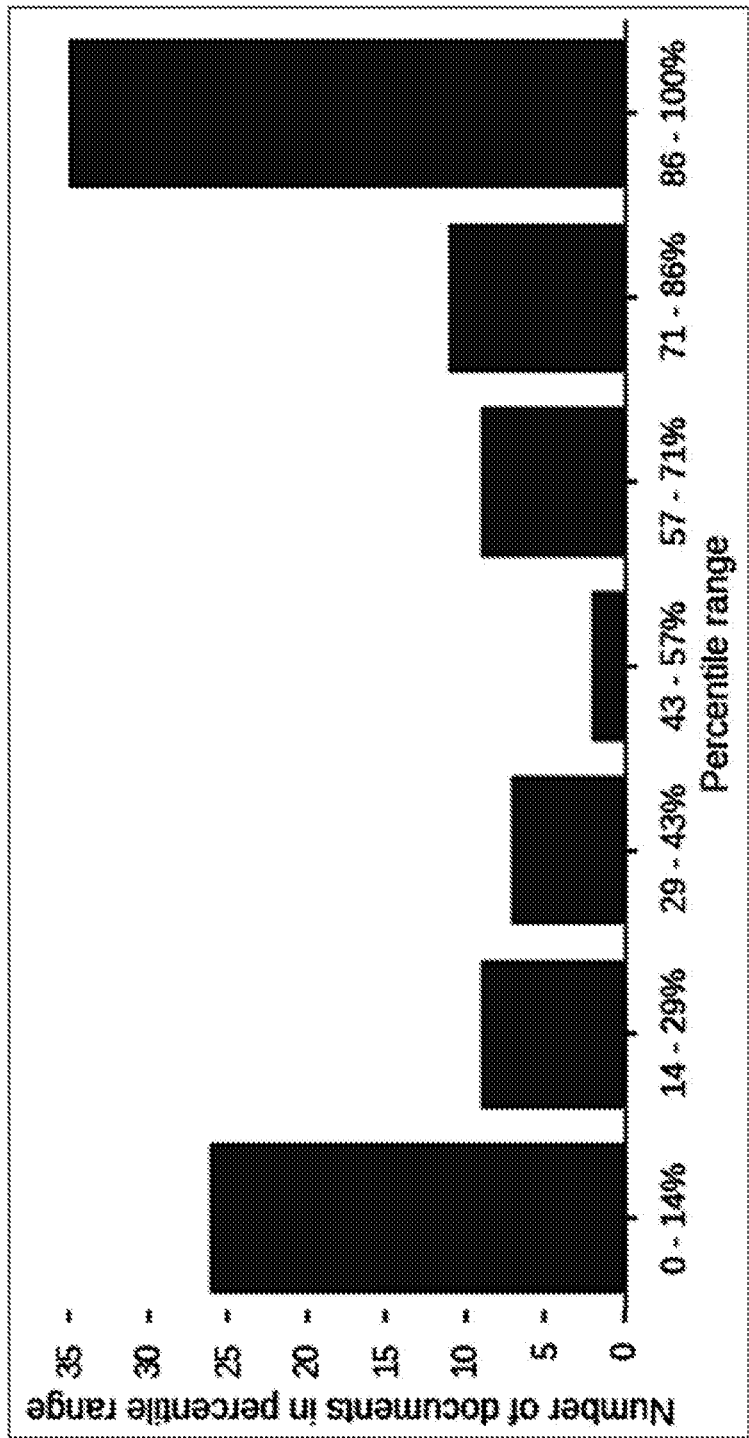
FIG. 16 is a histogram of the percentile range of labeled data with respect to a whole data set according to one or more examples of the present specification.

For example, in a period of about 10 months, the experts wrote special commentaries on approximately 100 newly-published documents, out of about 2,000 total (i.e., about 5%). As illustrated in FIG. 16 below, 61 of those documents were either in the bottom or top 14th percentile. The documents in the bottom 14th percentile had large and negative gentropy scores, decreasing the overall content diversity because their content was representative of the collection as a whole, whereas those in the top 14th percentile had large and positive gentropy scores, increasing diversity because their content is new or is an unusual combination of existing content. The domain experts wrote disproportionally about those documents that were outliers according to the present method (i.e., either in the upper or lower percentiles).

This specification provides a method to calculate the information entropy of the message graph of a corpus (i.e., the gentropy) using the content or metadata of each document (i.e., item of any type) along with a morphism (a structure-preserving map from one mathematical structure to another). The combination of these methods measures the relative diversity of particular items of the same kind (i.e., how much new information each provides.) The conditioned entropy, the gentropy score, may be used to identify noteworthy documents in a corpus, and to make recommendations to a user.

Figure 12:
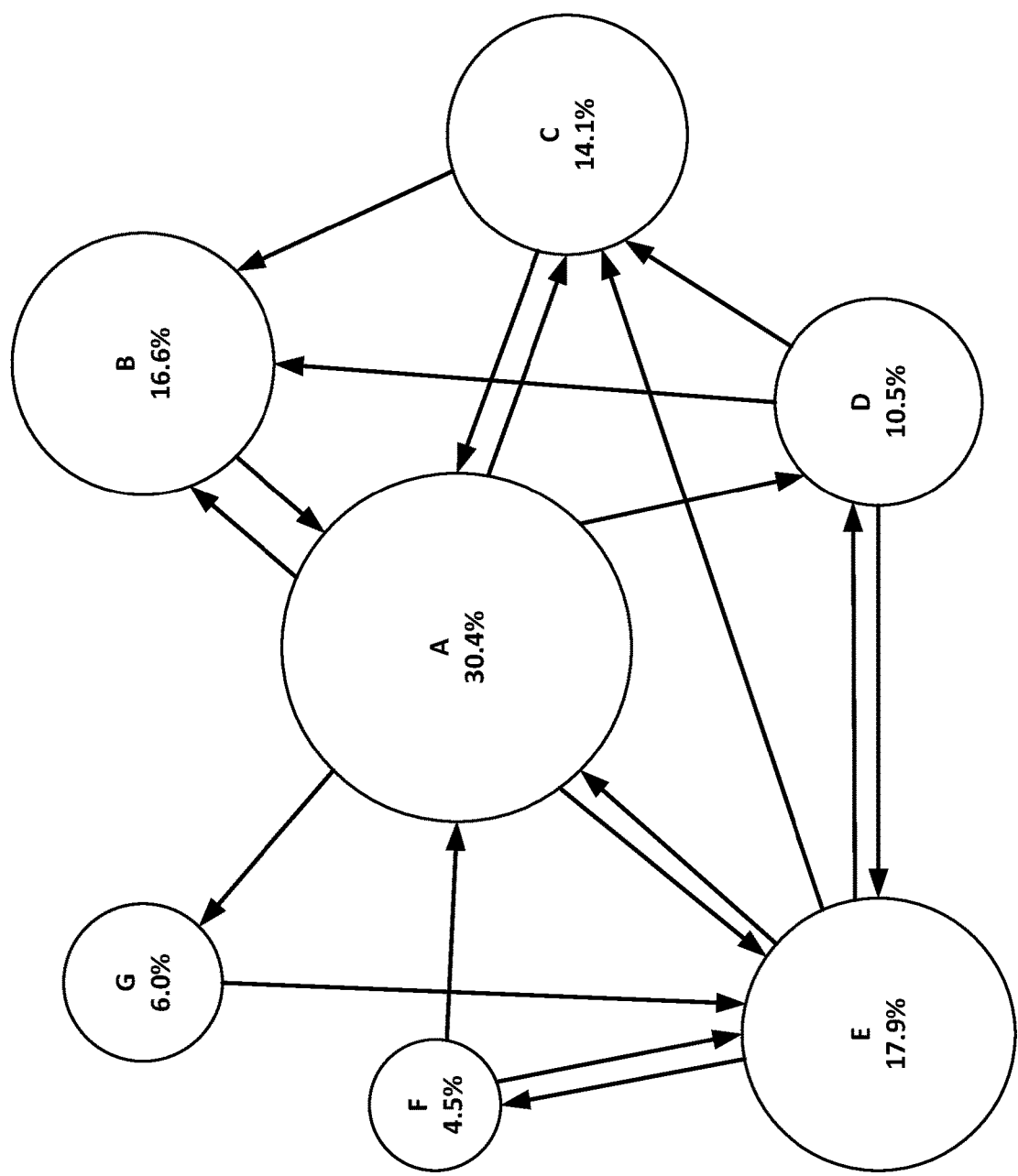
FIG. 12 is a message graph according to one or more examples of the present specification.

In an embodiment, the "Shannon information entropy" (named for Claude Shannon, considered "the father of information theory") is used. The Shannon entropy H of a discreet random variable X taken from a finite sample is $$H(X) = -\sum_i P(x_i) \log_2 P(x_i)$$

Where $P(x_i)$ is the probability distribution function and H is measured in bits. With the appropriate morphism or combination of morphisms, X can parameterize more than one scoring aspect as explained below. These aspects could include factors like content and user ranking. In this embodiment, $P(x_i)$ is the stationary occupation probability of each node based at least in part on the number of directed or undirected edges and the occupation probabilities of neighboring nodes. This concept is illustrated in FIG. 12, where node A has a large occupation probability because almost all other nodes point to it. Node G has a relatively large occupation probability because node A points to it (even though only node A points to it).

Figure 15:
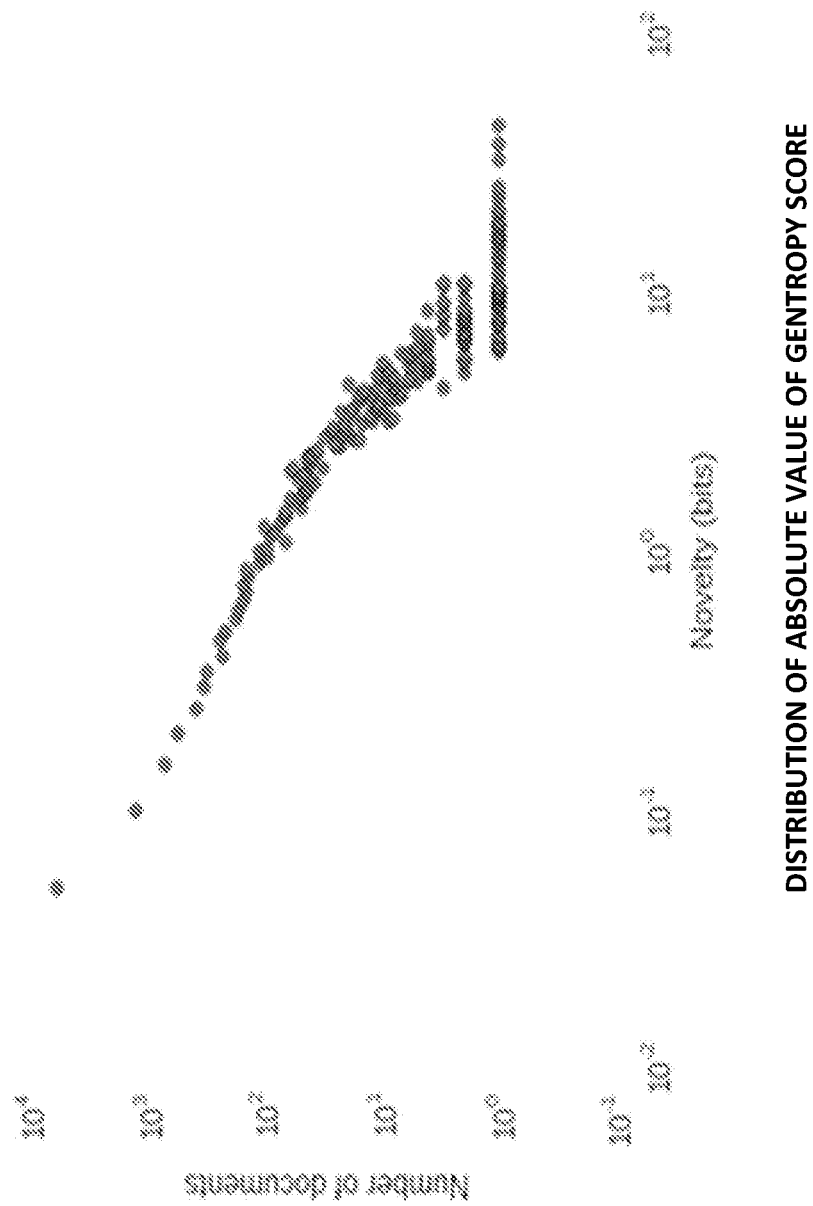

A morphism is a structure-preserving map from one mathematical structure to another, i.e., a rule or set of rules that transforms data but preserves certain relationships or properties of the data. The critical properties to be preserved are growth and preferential attachment (or other non-trivial topological features), which results in a graph that has a degree distribution that follows a power law. Without preferential attachment or other non-trivial topological features, the results of the present method could be inconclusive. However, scale-freeness is a characteristic of complex systems, and most networks of interest or other systems that can be mapped into a network are scale-free and show power law behavior, such as social networks and the world wide web (WWW). The rule that we used for the results illustrated herein is that for every document, a node was added to the graph (if the node did not previously exist), corresponding to each classification code assigned to the document, and edges were created between them (so it was an undirected multigraph based on the co-classification network of the documents whose stationary probability was calculated and updated after each step). $G_d$ was calculated for each document. As illustrated in FIG. 15, the power law behavior of the system is evidenced by the linearity in the log-log plot of the gentropy score distribution of the documents that increased diversity. Of these documents, about 4,000 contributed 0.1 bits or less while a handful contributed more than 10 bits.

In an example application, the method disclosed herein may be used with a collection of items constructed with the results of a keyword search, user behavior, or similar. The user may then elect whether to look at items that are representative of the collection or those that are more unusual or span more information, based on a gentropy score ranking.

In another example, a user may explore which items, not already in a collection, would change the collection's diversity the most. This can be used to provide recommendations for movies, books, music, and other media. Exploration could be manual or automatic. Items that decrease diversity are useful in some situations, for example in a collection of books with two subgroups, one on Java and Scala, and the other one on C and C++, yet another book on Java and Scala might be exactly what the user is looking for. Items that increase diversity (and the degree to which they do) might be useful in other situations, for example a book on all four languages will increase diversity more than one on Java and C++, and the user might be interested in acquiring different knowledge. A book on an esoteric programming language such as Brainfuck or LOLCODE that is not part of the collection increases its diversity, but to a lesser (distinguishably) degree, and the user might select books in this range.

In yet another example application, the method can be used to monitor compliance with anti-discrimination regulations or other hiring criteria. For example, the method may be used to assign a gentropy score (i.e., a diversity score) to a hiring decision, which may be orthogonal to other hiring criteria. If hiring decisions group strongly around a single gender, ethnicity, skill set, work experience, age or other factor, the hiring may be very non-diverse. This is desirable in some cases, such as when more computer programmers versed in a particular computer language are required to complete a project on time, but undesirable in others. A hiring decision that involves a person from a technical or life background that is less commonly hired may be considered "more diverse." This could be desirable, for example, when having an ethnically diverse team of product designers is required to penetrate new markets. Records can be used to measure diversity trends over time, and to identify "outliers" that are substantially different from "business as usual."

A system and method for binary linear classification will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of an enterprise 100 receiving classification services according to one or more examples of the present specification. This figure illustrates one nonlimiting example of using classification to provide enterprise-class spam filtering on a network. This example is intended to be nonlimiting, and other examples are provided herein to illustrate the broad applicability of the methods disclosed herein.

In the example of FIG. 1, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

In an example, one or more virtual machines are provisioned within workload cluster 142 to act as a machine classifier 190. Machine classifier 190 may be tasked with classification of network objects, including static and/or dynamic objects, for any suitable purpose, such as identifying spam and malware. For example, classification may be provided for enforcement of enterprise security and network usage policies, such as by classifying websites into various categories, each with different security settings or permissions. Similarly, machine classifier 190 may classify text documents for storage in a database file system. In another nonlimiting example, the machine classifier may be tasked with indexing content to ease searching and compilation, such as indexing patents by subject matter. In yet another example, network objects are classified for security purposes, and assigned to a classification such as "white" (permitted), "gray" (unknown), or "black" (barred) as part of an antivirus or antimalware scheme. In the latter case, the objects may be any network object as described herein, including static objects, active objects, and network-attached devices. These classifications may be based, for example, on identifying objects that introduce high entropy into the system, or alternately, that group strongly around other known objects of the same type. These embodiments are provided as nonlimiting examples only, and should be understood to be non-exclusive. Many other uses for object classification are possible, and are within the intended scope of this specification.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In another case, management console 140 may be provided as a web interface, on a desktop-class machine, or via a VM provisioned within workload cluster 142. Security administrator 150 or user 120 may use either management console 140 or client device 110 to "train" a data set, either interactively, or by submitting a batch of pre-classified documents.

Enterprise 100 may communicate across enterprise boundary 104 with external network 172. Enterprise boundary 104 may represent a physical, logical, or other boundary. External network 172 may include, for example, websites, servers, network protocols, and other network-based services. In one example, an attacker 180 (or other similar malicious or negligent actor) also connects to external network 172.

It may be a goal of users 120 and enterprise 100 to successfully operate client devices 110 and workload cluster 142 without interference from attacker 180 or from unwanted security objects. In one example, attacker 180 is a malware or spam author whose goal or purpose is to cause malicious harm or mischief, for example by injecting malicious object 182 (e.g., spam or malware) into client device 110. Once malicious object 182 gains access to client device 110, it may try to perform work such as social engineering of user 120, a hardware-based attack on client device 110, modifying storage, modifying client application 112, or gaining access to enterprise servers 142.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of nonlimiting example. In this case, the parent may perform some or all of the duties of security administrator 150.

When a new object is first encountered on the network, security policies may initially treat it as "gray" or "suspect." As a first line of defense, machine classifier 190 may inspect the object and attempt to classify it. For example, if the object is an e-mail, machine classifier 190 may attempt to determine whether it is "ham" or "spam." If the object is executable, machine classifier 190 may attempt to determine whether it is "malware" or "not malware," or whether it is a "permissible application" or "impermissible application." Again, these classifications may be achieved because an object either has high entropy, or groups strongly with other similar objects. Advantageously, this classification may be achieved via metadata, without the need to inspect the content of the object.

Figure 2:
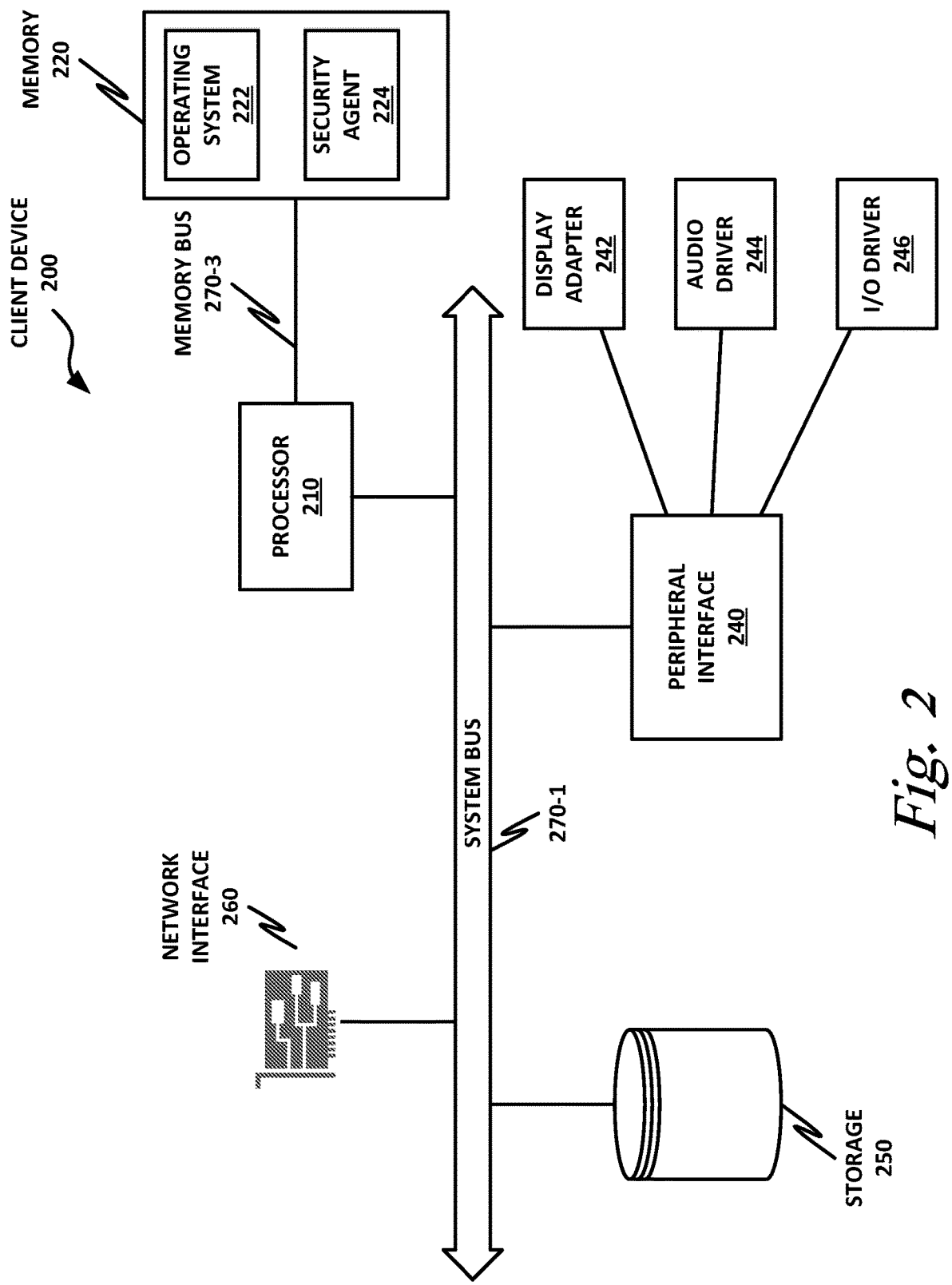
FIG. 2 is a block diagram of a computing device according to one or more examples of the present specification.

FIG. 2 is a block diagram of client-class computing device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client device 110 may be an example of computing device 200. Users 120 may use computing device 200 to interact with a classified data set, or to perform tasks such as performing interactive training or submitting batches of pre-classified documents.

Computing device 200 includes a processor 210 connected to a memory 220, having stored therein executable instructions for providing an operating system 222 and at least software portions of a security engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processors may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security agent 224, in one example, is operable to carry out computer-implemented methods as described in this specification. Security engine 224 may include one or more tangible non-transitory computer-readable mediums having stored thereon executable instructions operable to instruct a processor to provide a security engine 224. As used throughout this specification, an "engine" includes any combination of one or more logic elements, of similar or dissimilar species, operable for and configured to perform one or more methods provided by the engine. Thus, security engine 224 may comprise one or more logic elements configured to provide methods as disclosed in this specification. In some cases, security engine 224 may include a special integrated circuit designed to carry out a method or a part thereof, and may also include software instructions operable to instruct a processor to perform the method. In some cases, security engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security engine 224 may also include other hardware and software, including configuration files, registry entries, and interactive or user-mode software by way of non-limiting example.

In one example, security engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of security engine 224 to provide the desired method.

Figure 3:
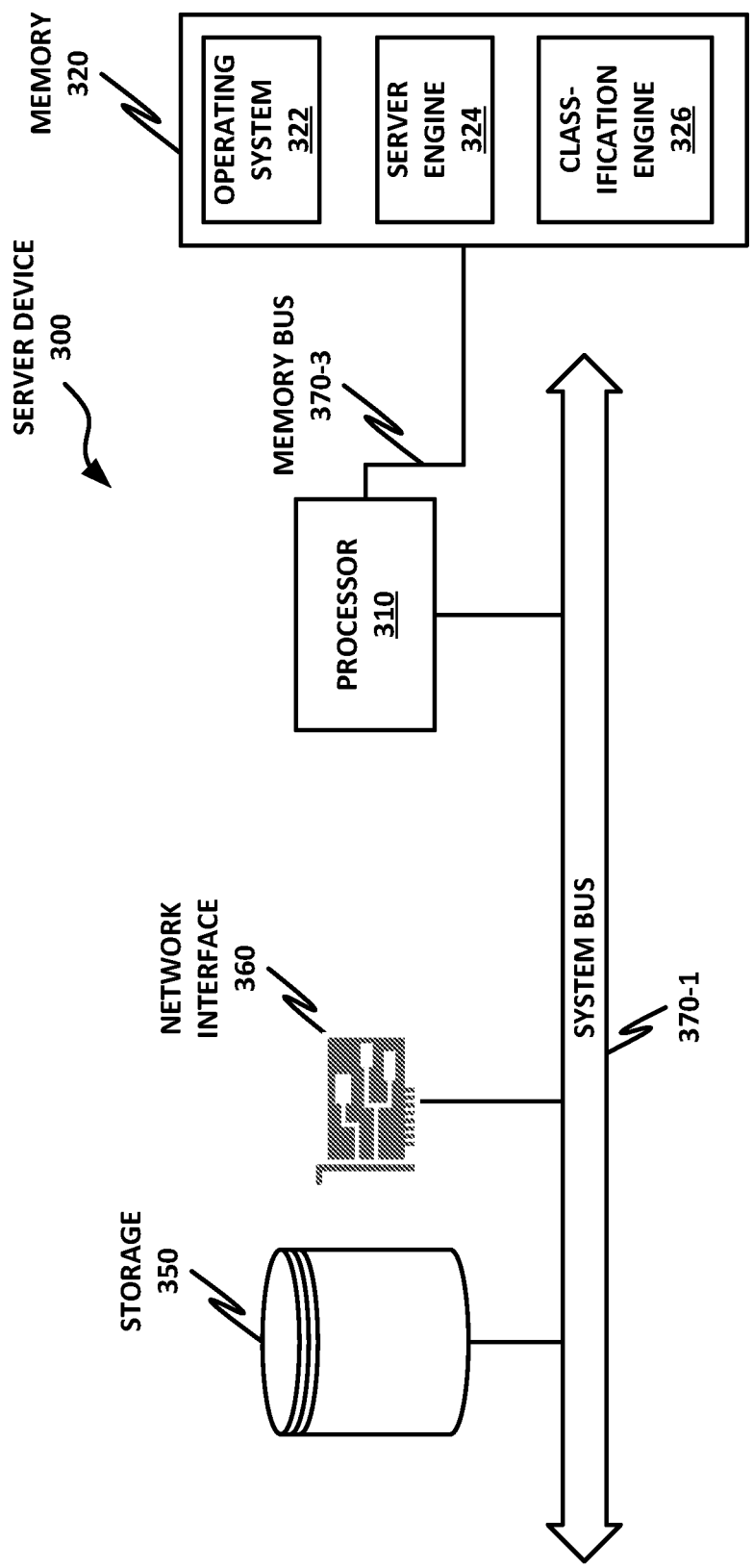
FIG. 3 is a block diagram of a server according to one or more examples of the present specification.

In certain embodiments, security engine 224 may be provisioned on client device 200 to enforce enterprise security, resource usage, or other policies. For example, when a user 120 directs client device 200 to a particular website, security engine 224 may query a server engine for an appropriate class and associated permissions. The machine may then locally enforce those permissions on client device 200. Enforcement may also be performed in whole or in part by server devices 300 (FIG. 3). In another example, security engine 224 may mark e-mails as "spam" or "ham." In yet another example, security engine 224 may simply provide an interface for accessing documents or objects that have been classified by classification engine 326.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise.

Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

In an example, any of the devices in workload cluster 142, including machine classifier 190, may be a server-class device 300. Server-class device 300 is disclosed as a separate device from client device 200 to illustrate one logical division of function between devices. But it should be understood that this example is not intended to be limiting, and that a classification engine 326 may be provided on a client device 200 in suitable circumstances.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide appropriate services. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server engine 324 may provide services such as a web-server, database server, database file system server, network antivirus or antimalware engine, or other functions that may benefit from the classification methods disclosed herein.

Classification engine 326 is also an engine as described herein, and may include one or more logic elements operable to carry out computer-implemented methods as described in this specification. Software portions of classification engine 326 may run as a daemon process. Note that "classification engine" is used throughout as a general term to include the engine that carries out the methods disclosed herein. This is true even in cases where classification engine 326 performs only a portion of its available function (e.g., even when it performs only scoring without classifying a document or message).

Classification engine 326 may include one or more non-transitory computer-readable mediums having stored thereon executable instructions operable to instruct a processor to provide classification services. At an appropriate time, such as upon booting server 140 or upon a command from operating system 322 or a user 120 or security administrator 150, processor 310 may retrieve a copy of classification engine 326 (or software portions thereof) from storage 350 and load it into memory 320. Processor 310 may then iteratively execute the instructions of classification engine 326 to provide the desired method.

More specific functions of classification engine 326 are provided throughout this specification.

Figure 4:
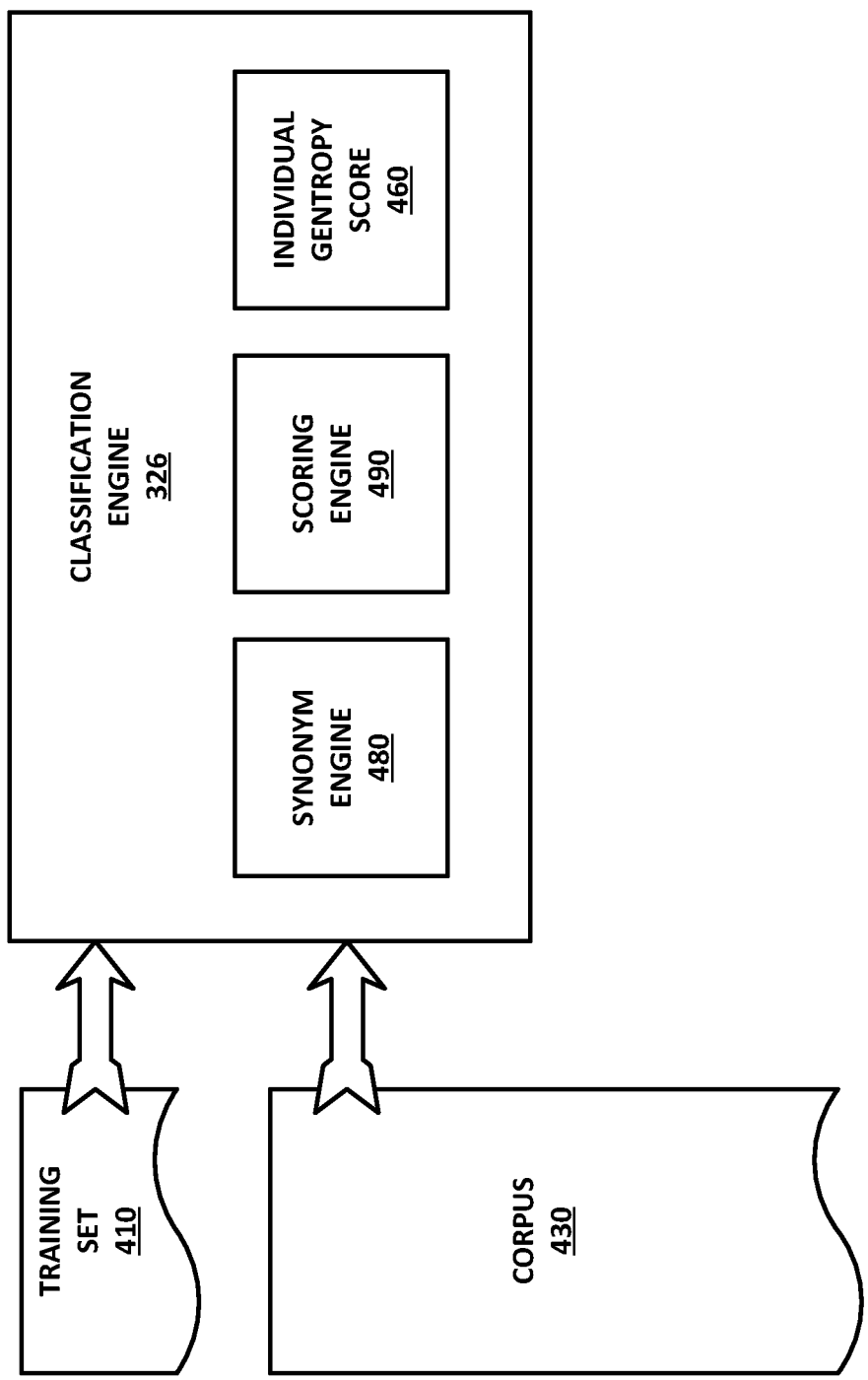
FIG. 4 is a block diagram of a classification system according to one or more examples of the present specification.

FIG. 4 is a block diagram of classification of a corpus of documents according to one or more examples of the present specification.

In this example, a training set 410 is first defined. Training set 410 may commonly be much smaller than corpus 430, and may include documents selected from corpus 430. In one example, corpus 430 is the corpus of published and issued U.S. patents and patent applications. Because this corpus comprises many millions of documents, it may be impractical for a human user to manually classify all of them. However, it may be useful for a user to manually or automatically classify some documents to give the corpus a starting point.

In an example, classification engine 326 receives training set 410, along with the larger patent corpus 430. Employing method 2100 of FIG. 20, or another suitable method, classification engine 326 assigns a class to each document based on its a individual gentropy score 460 and those of the training set.

Optionally, classification engine 326 may include a synonym engine 480 for data, metadata and other attributes, or any combination of these. Synonym engine 480 may be configured to identify words or phrases with identical or similar meanings, including variations on word forms (e.g., plurals and changes in tense), and true synonyms (e.g., "NIC" vs. "Ethernet card"). It can also be configured to identify functionally or statistically equivalent attributes, e.g., patent classification codes in the US patent classification system and the cooperative classification system.

Corpus 430 starts out in a first temporal state, having a first information entropy. Classification engine 326 then receives a document to be added to corpus 430. Classification engine 326 adds the document to corpus 430, thus causing corpus 430 to assume a second temporal state, having a second information entropy. Classification engine 326 computes the corpus information entropy and gentropy after adding the document, and also computes an individual gentropy score 460 ($SG_d$) for the document that was added.

Figure 5:
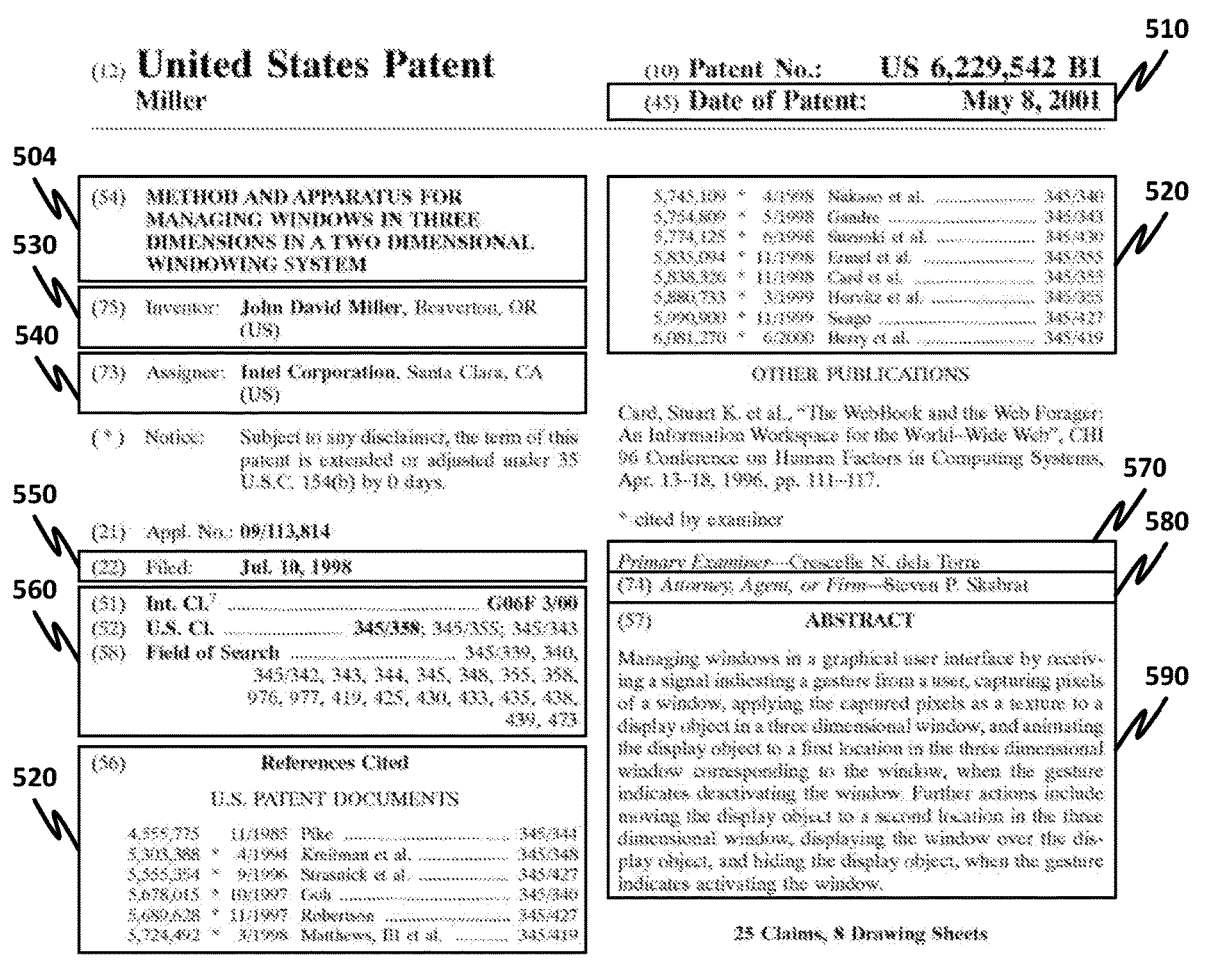

FIG. 5 is an illustration of feature sources that may be used in an embodiment where issued and published patents comprise corpus 430. In this example, the text of the abstract 590 or the content of the detailed description comprise the "data" of the document, which need not be considered for the present method.

The other fields of a patent may be considered "metadata," and may be used in embodiments of the present method. The patent classification codes are disclosed as an example that was used for validation of the method, but other metadata fields may be used either individually or in combination.

For example, words appearing in the abstract may stand in as a proxy for classification, as the abstract includes words most likely to be representative of the subject matter of the patent as a whole. Thus, words in the abstract may be used as classes. Certain embodiments may also employ the concept of word variations and synonyms. For example, "SoC" is a common abbreviation for "system-on-a-chip," and they may be treated as an identical word. Similarly, "system on a chip," "systems on a chip," and "systems-on-a-chip" may all be considered identical for purpose of classification engine 326. Similarly, the terms "jelly bean" and "Easter egg" may be considered to be in related arts, though they are not strict synonyms.

Non-identical words with similar meaning may also be useful. This may include a recognition that words can be both contemporaneously synonymous, and that words can change over time. Indeed, as technologies mature, they may organically acquire new and different nomenclatures. To provide just one example, the first known patents on transistors did not refer to the devices as "transistors." Rather, they referred to them as "amplifiers" or similar. Thus, patent date 510 (FIG. 5) may be a relevant metadata factor. For a 2015 date, "transistor" may be a more predictive term, while for a 1925 date, "amplifier" may be a more predictive term. Thus, classification engine 326 may include a synonym engine 480 (FIG. 4) to identify synonyms, including temporal spacing of synonyms.

Additional metadata fields may also be used as attributes. As described herein, classification codes 560 were used in a validation test, and both high and low entropy in this field was found to be predictive of "interesting" patents. Other fields that can be used in a classification scheme include title 504, inventor names 530, assignee 540, filing date 550, references cited 520 (similar to hyperlinks—note that additional connections may be formed when future patents cite back to this one), examiner names 570, attorney 580, and abstract 590, by way of nonlimiting example.

Figure 6:
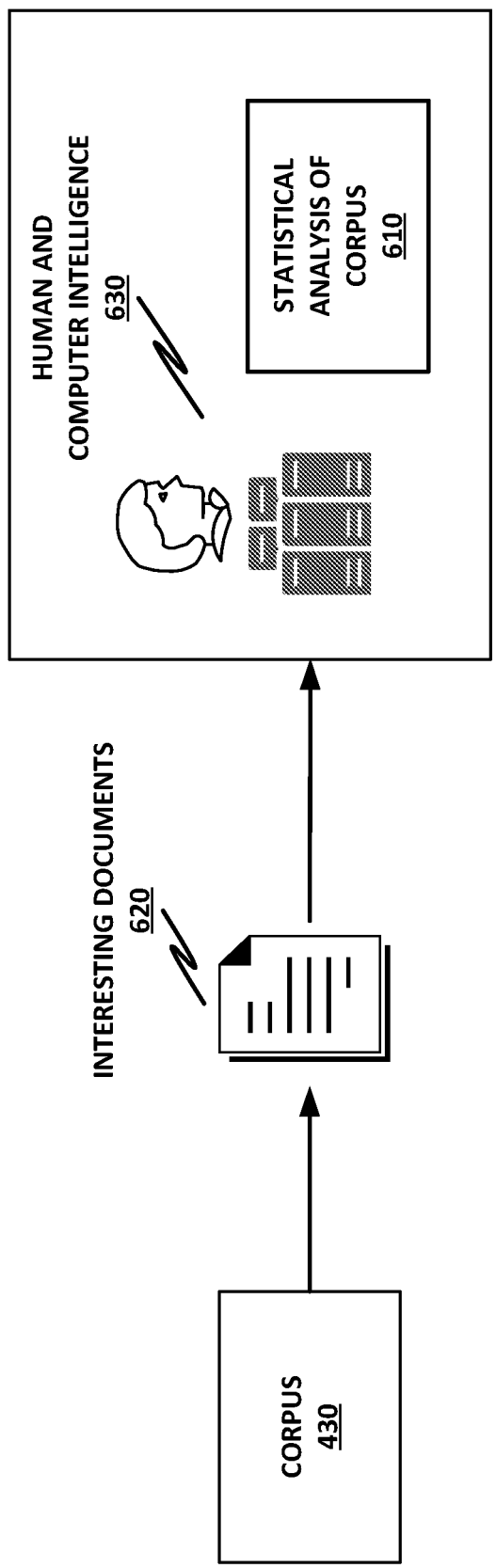
FIG. 6 is a workflow diagram of document classification according to one or more examples of the present specification.

FIG. 6 is a workflow diagram of document classification according to one or more examples of the present specification. In this example, corpus 430 is any suitable corpus consistent with the present specification. From within corpus 430, interesting documents 620 are identified. A human user or a computer or automated system 630 interact with interesting documents 620 and can perform desired statistical analyses on important documents 620 which might be a subset of corpus 430 or the whole corpus 430.

Figure 7:
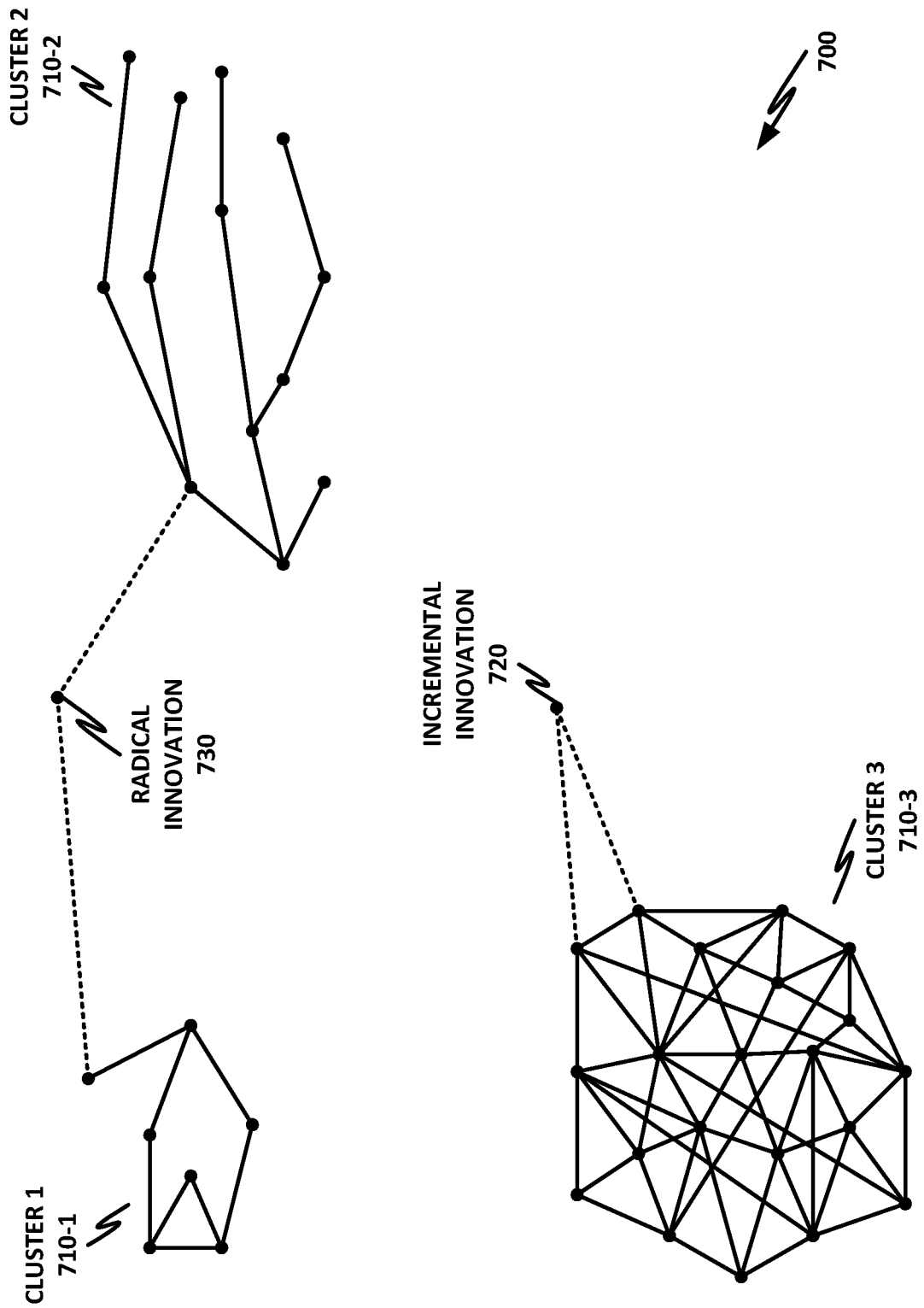
FIG. 7 is a message graph according to one or more examples of the present specification.

FIG. 7 is a message graph created according to one or more examples of morphisms of the present specification that represents relationships between documents in a corpus. In the example of FIG. 7, message graph 700 includes three clusters, namely cluster 1 710-1, cluster 2 710-2, and cluster 3 710-3. Each cluster may represent, for example, a broad subject matter area. By way of illustration, cluster 1 could represent the area of fishing lures. Cluster 2 could represent the area of semiconductor device manufacturing. Cluster 3 could represent the area of computer security.

Each node in message graph 700 may represent an attribute or category, such as a classification code. Each edge of the graph represents a connection between attributes, such as a patent that was assigned several. Each time an "event" happens (in this case, the event is that a new patent is added to the corpus), its connections are added to the message graph. This represents a change in state. Message graph 700 was in a first state before the new patent was added. After the patent was added, some change in information entropy DH has occurred, and the corpus is now in a second state with a new information entropy.

Incremental innovation 720 may occur when, for example, a new patent issues with two classification codes that already exist in cluster 3 710-3, plus one new code that was not previously linked to cluster 3 710-3. It should be understood that labeling the patent as "incremental" does not in any way imply that it is unimportant, nor is it a judgment of the breadth, scope, or monetary value of the newly-issued patent. Rather, the innovation is incremental because it has only a modest effect on the overall entropy of the graph, because it has introduced merely a new node to cluster 3 710-3 which already had numerous nodes.

In contrast, radical innovation 730 has a much more significant effect on the entropy of the corpus. In this case, radical innovation 730 may arise from a patent that, for example, identifies a novel material or new use for an existing material that is applicable to both fishing lures and semiconductor manufacturing. Again, labeling node 730 as a "radical" innovation does not represent a judgment on the importance, breadth, scope, or monetary value of the newly-issued patent. Rather, it indicates that radical innovation 730 has a relatively substantial impact on the overall entropy of the corpus.

The method not only finds exemplars or outliers with respect to the corpus, but because a score is assigned, it can also quantify and rank the degree to which, e.g., outliers are outliers. For particular cases, the most interesting documents might be in a particular range as opposed to in the extremes. In a nonlimiting case, a user might like movie recommendations that are not very extreme outliers, but are close to the 80th percentile. In another nonlimiting case, certain categories of items that the user might be interested in, such as funny yet disturbing movies, might consistently fall in a particular range.

Message graph 700 can be used to visually represent data in a way that is very useful for a human observer. For example, radical innovation 730 may be highlighted in a special color that draws particular attention to it. If a human user is searching for prior art patents that may anticipate a patent currently being litigated, radical innovation 730 may in fact be an outlier that is less important, and may be discarded. In this example, the searcher may be looking rather for patents that are more narrowly focused on the subject matter at hand. Similarly, a scientist reviewing literature in her art may prefer to focus on nodes that have many links within their clusters (e.g., frequently-cited publications). In that case, message graph 700 may color nodes with different colors or intensities to represent the nodes with the most links (citations) within cluster 710-3. In another example, a web user is searching for information about the Free Speech clause of the First Amendment. In that case, low-entropy nodes (those with many links) may be of more interest than high-entropy nodes (e.g., a Timecube rant that links free speech to (pseudo-) quantum mechanics and government conspiracy theories). In these cases, radical innovation 730 may be a curiosity at best and of little practical value to the system.

On the other hand, if message graph 700 is being used for security purposes, nodes heavily within clusters 710 may be of little interest. For example, if each link represents an access event by a user (or machine) to a particular network resource, cluster 3 710-3 may represent users in the accounting department accessing resources commonly accessed by accounting personnel. Thus, there may be many, many links between nodes within cluster 3 710-3. However, if a radical innovation 730 occurs, that may represent a user or machine accessing a resource outside of his normal sphere of influence (for example, a user in accounting accesses a network management console generally used by the IT staff). If the gentropy from a network object or event is above one or more thresholds, this may indicate that a user is behaving suspiciously, or that his machine has been compromised and may be trying to access restricted network resources.

Figure 8:
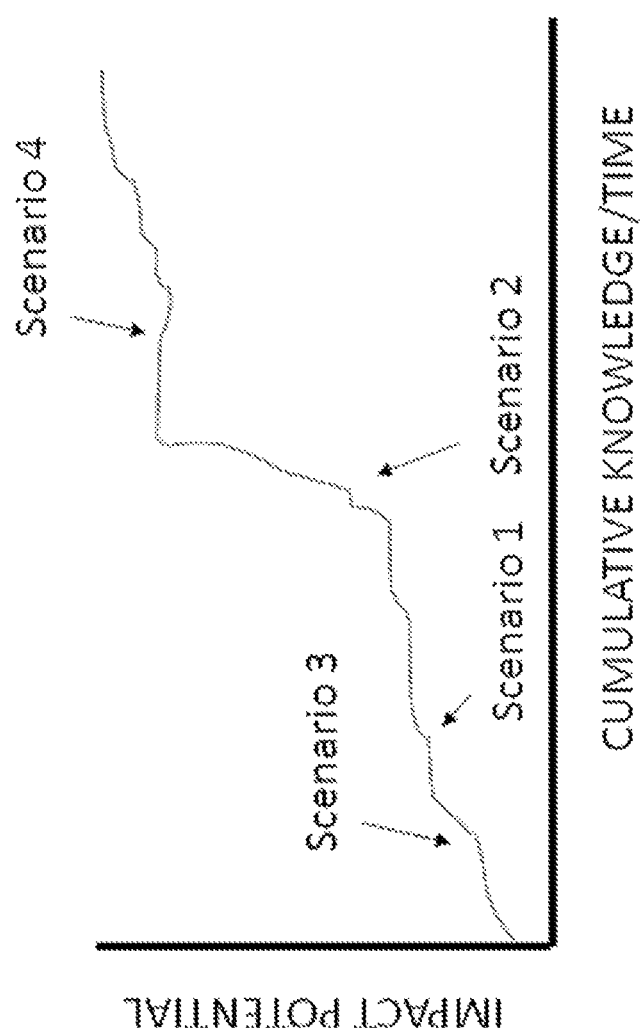
FIG. 8 is a graph of impact potential according to one or more examples of the present specification.

FIG. 8 is a graph of the impact potential of newly acquired knowledge (with respect to, for example, an individual, company, government, or human civilization) according to one or more examples of the present specification. This graph illustrates four possible scenarios, and their potential impact.

Scenario 1 is completely new knowledge or a completely isolated event. Although this new knowledge or event may be a substantial or groundbreaking contribution to the body of knowledge of human thought, and indeed may be a seminal innovation in its field, its instantaneous impact on the entropy of the corpus as a whole is fairly modest, as it has few, if any connections. In the security field, it might be a user using an application for the first time on a machine or network.

Scenario 2 is new knowledge that joins previously-isolated clusters. As illustrated above, this innovation may have a relatively significant impact (a "leap") on the entropy of the corpus, as in the case of a novel material with applications both in fishing lures and semiconductor manufacturing. Another example is realizing that the force that pulls an apple towards the ground and the force that keeps the Moon rotating around the Earth is one and the same, thus joining botany and astronomy and starting a scientific revolution.

Scenario 3 is incremental knowledge in existing cluster. As illustrated by incremental innovation 720 above, this may be a relatively modest innovation that strengthens ties within a cluster, and may add a new node to the cluster. An example is the realization that phonon anharmonicity has thermodynamic importance in a material after it has been determined to be the case in a number of other materials.

Scenario 4 is solidification of existing knowledge. This may take place, for example, after a subfield like phonon thermodynamics or hydrogen storage become mature enough that an expert can write a review article summarizing the findings over the previous decade or so. Another example is the publication of a textbook when a whole field becomes mature and widely-known, for example introductory physics or introductory chemistry. Documents like the American Constitution summarize a set of values generally held by the population of the country circa 1789.

Figure 9:
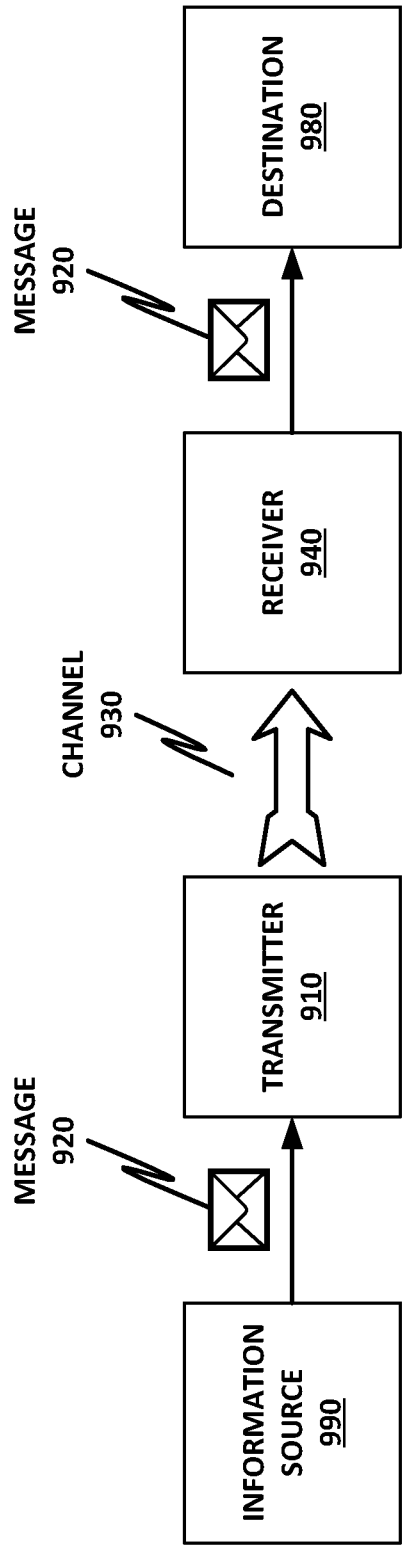
FIG. 9 is a block diagram of a mathematical theory of communication in information theory, according to one or more examples of the present specification.

FIG. 9 is a block diagram of a general communication system in the mathematical theory of communication according to one or more examples of the present specification. This figure illustrates the piece parts of the methods disclosed herein.

Information source 990 produces a message (or sequence of messages) 920 to be communicated to the receiving terminal 940. The message 920 might be of various types, such as a sequence of letters in a telegraph of teletype system, or scientific knowledge in the scientific enterprise.

Transmitter 910 operates on a message 920 in some way to produce a signal suitable for transmission over channel 930. For example, patent attorneys encode technical and scientific knowledge into legal documents. Priests and clerics encode divinely inspired ethical and social guidelines into sacred texts and artifacts. The signal might be perturbed by transmitter 910, in which case the encoding of message 920 is not perfect.

Channel 930 is the medium used to transmit the signal from transmitter to receiver. It might be a pair of wires, a coaxial cable, a patent or scientific paper, the Ark of the Covenant, gravitational waves, or any other medium. Transmission could be across time, space, or both. The signal might be perturbed by the channel 930, inducing noise.

Receiver 940 performs the inverse operation of that done by the transmitter, reconstructing the message 920 from the signal. A patent attorney could reconstruct patents into technical or scientific knowledge. A priest could reconstruct sacred texts into ethical or social guidelines. A morphism reconstructs aspects of a document or relationships between documents or their attributes. The signal might be perturbed by receiver 940, in which case the decoding of message 920 is not perfect.

Destination 980 is the person or thing for whom message 920 is intended.

Figure 10:
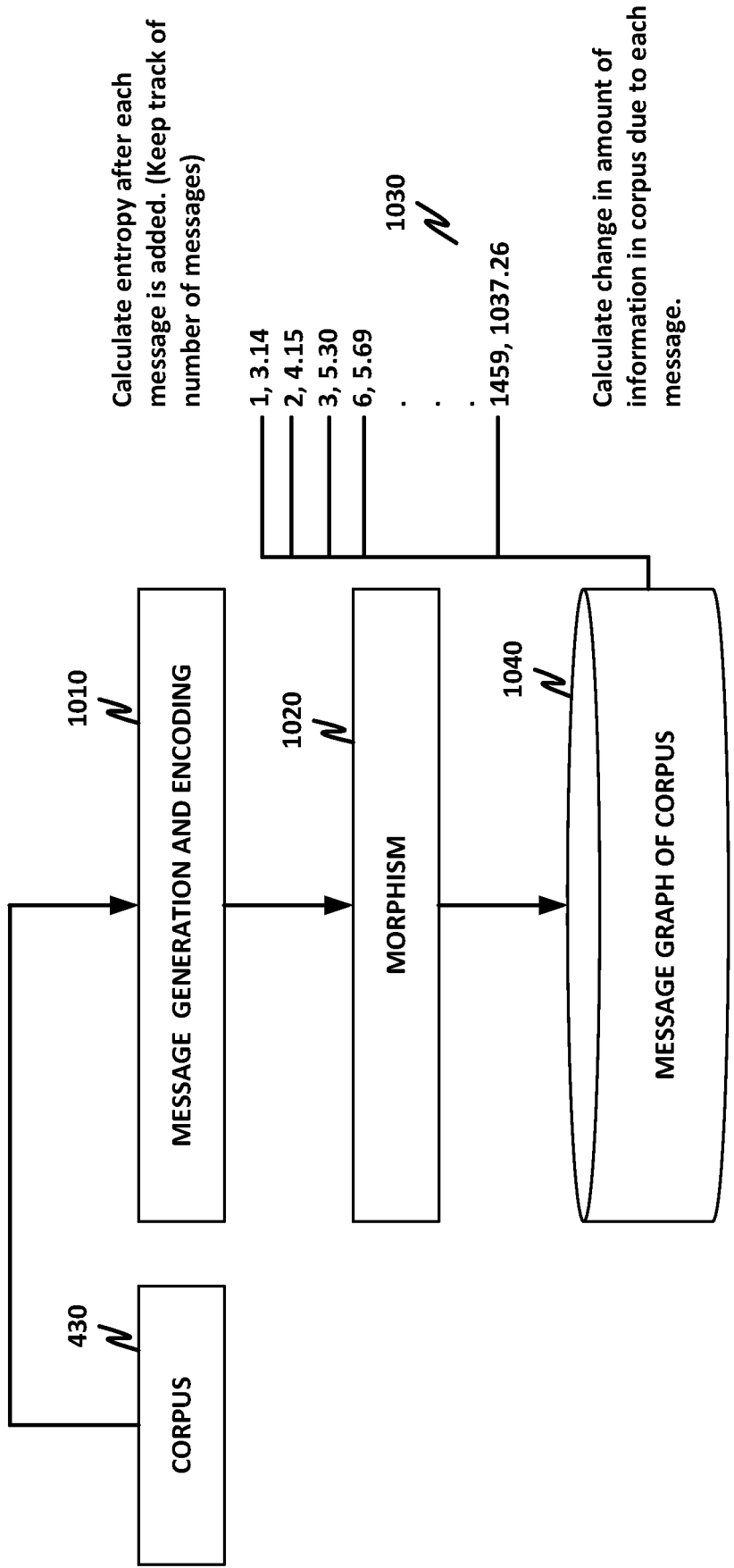
FIG. 10 is a block diagram of a classification method according to one or more examples of the present specification.

FIG. 10 is a block diagram of a classification method according to one or more examples of the present specification. Block 1010 represents message generation and message encoding, such as when information source 990 generates a message 920 that is operated on by transmitter 910 and transmitted through channel 930. This could represent, for example, a person creating new knowledge, acquiring the services of a patent attorney to apply for and receive a patent, and the patent being loaded into a patent database such as corpus 430.

In block 1020, one or more morphisms operate on a document. Morphisms act as receiver 940 and translate document data or metadata into a mathematical message graph that approximate destination 980.

Finally, the individual message is added to the message graph of the corpus 430. As illustrated in this figure, the total information entropy of a state, $H_n$, as well as the entropic contribution of the new message $S_d$, may be computed after each addition to the corpus. The individual contributions might be saved for future reference in ledger 1030. Each addition represents a change of state in corpus 430, with each discrete state having its own entropy value. For example:

| State | # of Messages | $H_n$/bits (Corpus) | $S_d$/bits (Message) |
|---|---|---|---|
| 0 | 0 | 0 | 0 |
| 1 | 1 | 3.14 | 3.14 |
| 2 | 2 | 4.15 | 1.01 |
| 3 | 3 | 5.30 | 1.15 |
| 4 | 6 | 5.69 | 0.39 |
| ... | ... | ... | ... |
| 1459 | 1482 | 1037.26 | 0.21 |

Note that in states 1-3, one message each is added for each state, and $S_d$ for that individual message is computed. In state 4, three additional documents are added. Because these documents are added as a group, and hence comprise a single message, the individual entropy for each document is not computed. Rather, $S_d$ for this state is the composite entropy contributed by the three documents together. As can be seen here, the total $S_d$ for the three documents is only 0.39 bits (whereas surrounding contributions are more on the order or 1.0 bits), so it may be decided that the individual entropy of any one of the three messages is not of any special interest.

In contrast, the message added in state 1 has an individual information entropy of 3.14 bits. This appears to be a radical innovation. However, it should be noted that the calculation of $S_d$ is not a linear calculation (as explored above). Thus, the first message in a corpus is expected to make a significant contribution to the overall entropy. Thus, this message may not be as important as it appears at first pass. Stated otherwise, the first message to join two clusters may appear to be a radical innovation, but if that message is the third message in the corpus, and the two clusters each have only one node, and those nodes end up being densely packed in the center of a larger cluster as the corpus evolves, the contribution of message 3 may appear much less radical in hindsight.

On the other hand, messages added much later (such as state 1459) may be expected to contribute a much smaller $S_d$ to the overall information entropy of the corpus. Thus, while message 1482 contributes an $S_d$ of only 0.21 bits, which is the smallest raw $S_d$ in the table, weighted against the size of the corpus at the time (1,459 messages), 0.21 bits may in fact be a substantially entropic contribution. Thus, methods are disclosed herein for conditioning and weighting values of $S_d$ so that entropy calculations are more fair. The conditioned $S_d$ is the gentropy score $G_d$ of the message.

One example of a morphism is co-classification, such as the case where the corpus includes classification codes for patents. This is a classification system that roughly spans the full human-knowledge space. Each classification code is a symbol and the universe of symbols is the alphabet of the corpus (in the information theoretical sense). The co-classification (e.g., the connection between the set of codes assigned to a given document) is the message transmitted in that document. Thus, the message is analogous to a sentence in written language where the individual classification codes can be regarded as words with a semantic relationship, i.e., the codes are not assigned randomly but convey a fundamental attribute of the message. Relationships between primary and secondary classification codes can provide additional information.

Another example of a morphism is a co-topic with latent semantic indexing (LSI). In this case, each LSI topic vector is a symbol. The universe of topic vectors is the alphabet of the corpus. A co-topic (set of topics present in a document) is the message transmitted by that document.

Note that these morphisms need not rely on the content of the documents themselves, such as "key words" or web scrapers. Rather, they rely on metadata attached to or associated with the document (patent classifications, citations in a paper, LSI topics, inventors, bags of words, links to and from a web page, semantic web, internet hits, "likes," etc.).

FIG. 11 is an illustration of evolution of a message graph 1040 according to one or more examples of the present specification. In this example, the message graph starts with three nodes, named A1, B1, and C3. Consider the example where the graph represents citations in academic literature. Document 1 may be a published paper that cites three previous papers, namely A1, B1, and C3. The resulting corpus graph (body of knowledge) is identical to that of the document, as this is the first document in the corpus.

Document 2 is another academic paper, this one citing A1, B3, and D5. In this case, no new connections are made between A1, B1, and C3, as B1 and C3 are not cited in this paper. However, two new nodes, B3 and D5, are introduced to the message graph, with one connection each to A1. This is a co-citation network. Generally, the weight of the edges can be conditioned, for example by an exponential decay factor that can account for the half-life of a particular message to account for, e.g., obsoleteness. This would be particularly appropriate for a co-citation network.

Document 3 is yet another academic paper, this one citing A1, B1, and B3. A1, B1, and B3 are all already in the message graph, and there is already an A1 to B3 connection, and B1 to B3 connection. Thus, these links are strengthened, as one additional A1 to B3 connection, and one additional A1 to B1 connection is added.

FIG. 12 is a message graph according to one or more examples of the present specification. This graph shows more particularly the "occupation probability" of each node. This is an illustration of the stationary state of a graph in which the size of the nodes is approximately proportional to their occupation probabilities based on the number and directions of the edges. A probability density function with a categorical variable can be calculated from the occupation probabilities.

The occupation probability $P(x_i)$ of node i in the message graph of a corpus depends on its number of edges and on its neighbors in a ripple effect. It can be calculated using any suitable algorithm, including repeated sampling taking advantage of the ergodicity of the graph, or other method that outputs a probability distribution related to the likelihood that a traverse of the graph visits a particular node. The set of occupation probabilities of the nodes is the probability distribution P(X). The message graph information entropy (gentropy) is calculated as:

$$H(X) = -\sum_i P(x_i) \log_2 P(x_i)$$

The information entropy is maximized when the probabilities are equally distributed. For example, the information entropy in the case of two possibilities, such as a coin toss, with probabilities p and q=1−p for heads and tails respectively is H=−(p $\log_2$ p+q $\log_2$ q). When the coin is fair, i.e., not biased towards either head or tails, p=q=0.5 and H=1 bit. By definition, the information entropy is zero when all the probabilities $P(x_i)$ are zero except for one which will have the value unity. In this case, there is no uncertainty and no information to be gained from the coin toss.

The probabilities for each node can be calculated iteratively using an algorithm, such as brute force or PageRank, or via repeated sampling of the system. Using repeated sampling to calculate the node occupation probabilities, a node is chosen based on its occupation probability based on a previous estimation of the occupation probability density function of the graph (or completely at random if no previous estimation exists), and edges are selected at random to traverse other nodes until a cutoff number of nodes have been selected or a dead-end is reached. The number of samples and cutoff number of traverse nodes can be optimized so that the probability density of function is approximated appropriately for the particular use with the minimum amount of computational power. The previous occupation probability is updated with the new statistics and the estimation is finalized. The calculation converges when the node occupation probabilities consistently change by less than a specified cutoff (the ergodic theorem ensures that the true stationary probability distribution is approximated by this empirical sampling).

The information entropy of an information source is the total information contained in the information source divided by the number of messages n, so it is the average amount of information per message. The amount of information ΔI that a new item adds to the information source (the collection of items) can be measured by calculating the change in entropy when the nodes and edges related to that new item are added to the graph, ΔI=(n−1)ΔH. The precise nature of the information depends on the morphism.

Figure 13:
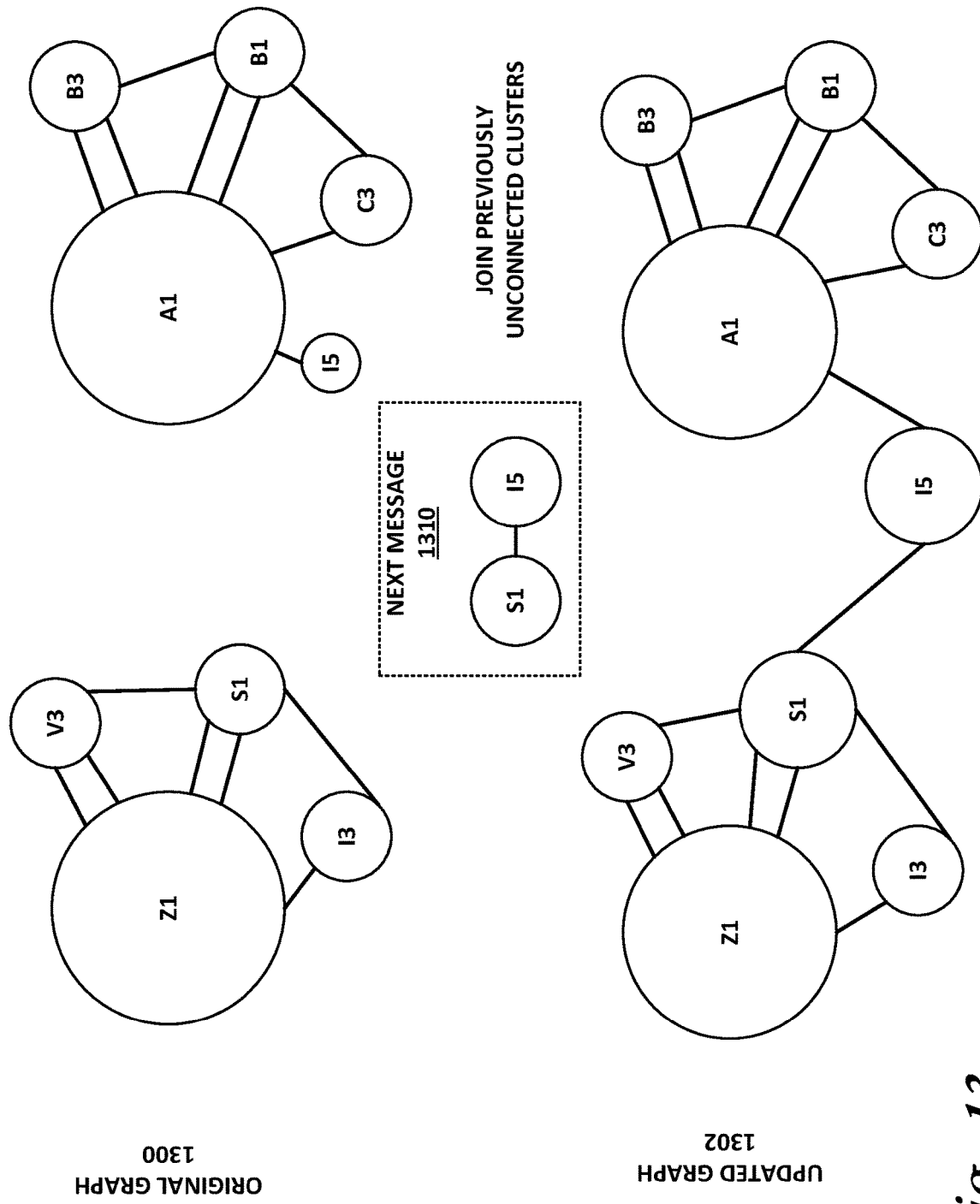
FIG. 13 is an illustration of evolution of a message graph according to one or more examples of the present specification

FIG. 13 is an illustration of evolution of a message graph according to one or more examples of the present specification. In this case, the original graph 1300 includes two clusters, centered around nodes Z1 and A1. The size of the nodes represents their occupation probabilities but are not necessarily drawn to scale. This graph is very lopsided (two very high probability nodes surrounded by several lower-probability nodes), so it has low entropy.

The next message in the corpus is S1-I5. The result is that the graph is less lopsided, because nodes Z1 and A1 have decreased in probability, while S1 and I5 have increased in probability. The overall entropy of the graph has increased by the joinder of the two nodes.

FIG. 14 is an illustration of evolution of a message graph according to one or more examples of the present specification. In this example, as in the previous example, original graph 1400 is lopsided, with high-probability node Z1 surrounded by lower probability nodes I3, S1, and V3.

The next message in the corpus is Z1-V3-S1 as illustrated. The result is an even more lopsided graph, with Z1 increasing in probability, and additional connections being made to V3 and S1. In this case, the entropy of the graph has decreased because the last message did not introduce any new connections, but rather merely reinforced existing connections. As discussed above, depending on the application, either one of graph 1300 (FIG. 13) or 1400 (FIG. 14) could be of greater interest.

FIG. 15 a graph of a distribution of the absolute value of gentropy scores according to one or more examples of the present specification. This graph illustrates a system with a power law distribution, which is common for systems with growth and with preferential attachment. These attributes are expected to be present in systems with processes in which some quantity is distributed among a number of objects according to how much of that quantity they already have. These systems are widely observed in natural and human made systems, including the Internet and the World Wide Web, social networks, citation networks, traffic systems, astronomical systems, income inequality, etc.

This figure illustrates the technological diversity of patents in a particular industry. The morphism rules can be designed to score a collection of items relative to desired attributes and their relationships. In the co-classification scheme used in the embodiment illustrated here, the documents that increase diversity are those that explore unusual regions of design or knowledge space (unusual combinations of ideas) and have a positive gentropy score, while those that decrease diversity are representative of the collection of documents as a whole and have a negative gentropy score.

The effect of decreasing diversity can be achieved by, for instance, a review article or a text book. These summarize a field, and are important references, and are located in well-explored regions of the design space. These typically do not advance novel ideas. Seminal works, on the other hand, may be expect to increase diversity (although not all documents that increase diversity are seminal).

One example of a system with growth and preferential attachment is the patent reference network. In this case, growth comes from the issuing of new patents and the quantity that gets preferentially distributed is the number of references to a patent. Patent examiners tend to reference patents that are referenced often by other patents and other examiners because they are easier to find using traditional search methods, and because patent examiners (who may be considered experts in searching their particular fields) get to know them very well. These patents may even end up in personal bookmarks. The result is that patents that are highly referenced and more visible are more likely to be referenced by new patents than patents with few other patents referencing them. In many cases though, less well-known patents could be important or relevant, but fall into accidental obscurantism because nobody has read them or cited them in the first place, sometimes by arbitrary or random reasons, possibly due to the sheer volume of new knowledge being created.

FIG. 16 is a histogram of the percentile range of 99 technical documents in a particular industry that were of interest to domain experts with respect to the whole corpus of about 2,000 documents and a co-classification morphism. If the method disclosed herein lacked predictive power, or if the domain experts reviewed documents randomly, each range in the histogram would be expected to have roughly the same number of documents. However, as seen, the histogram is weighted heavily to the extreme ends, illustrating that in this embodiment, the documents with large and positive (top percentile) and large and negative (bottom percentile) gentropy scores are of particular interest. In other words, in a corpus of patents, those of most interest to a group of human experts are those that are highly innovative or matures technologies that can be readily be applied to current processes in the industry.

Figure 17:
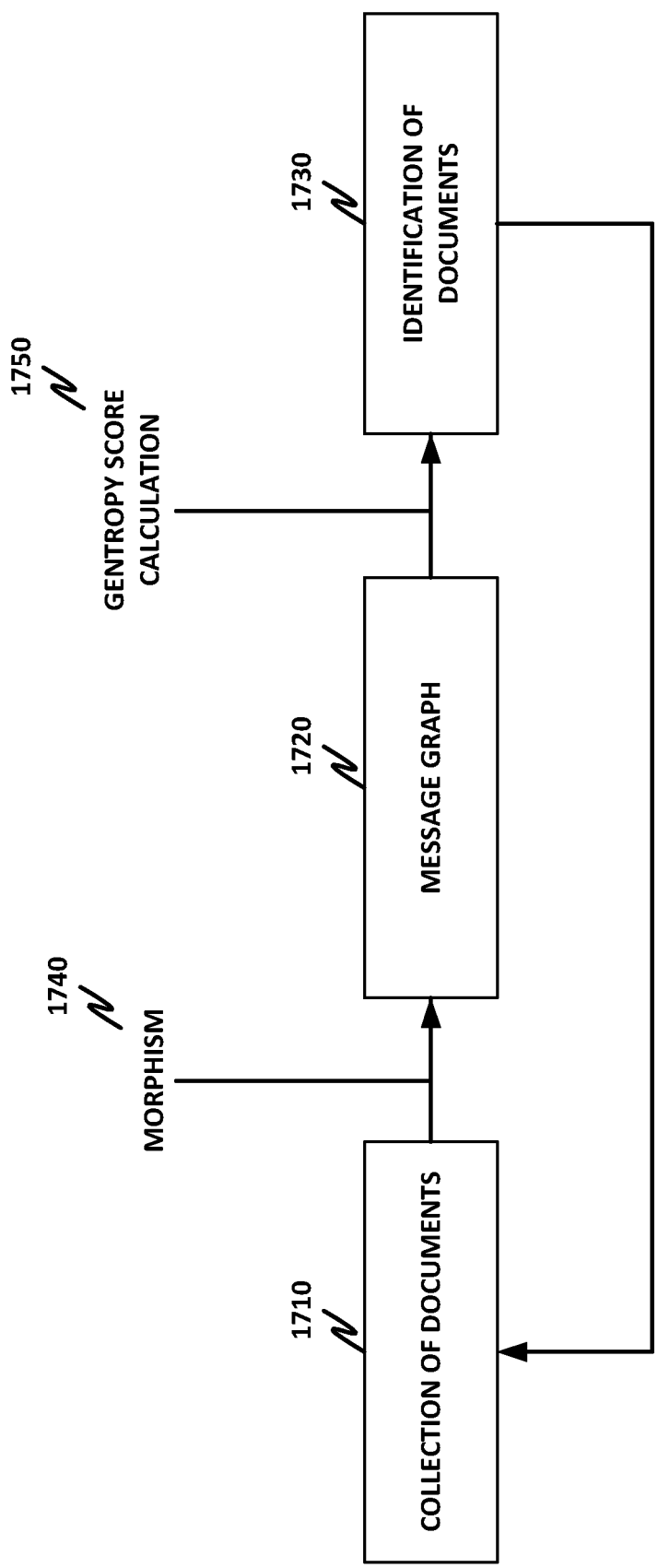
FIG. 17 is a block diagram of a classification process according to one or more examples of the present specification.

FIG. 17 is a block diagram of a classification of documents according to one or more examples of the present specification. As this FIGURE illustrates, starting with a collection of documents 1710, a morphism 1740 is used to build a message graph 1720 according to the attributes of one or more documents and the relationships between their attributes. This message graph 1720 might represent knowledge space when the documents are patents. The gentropy score is calculated as described before and used for identification of interesting documents 1730. The documents identified as interesting become a new collection of documents 1710 and further refinement is possible.

Figure 18:
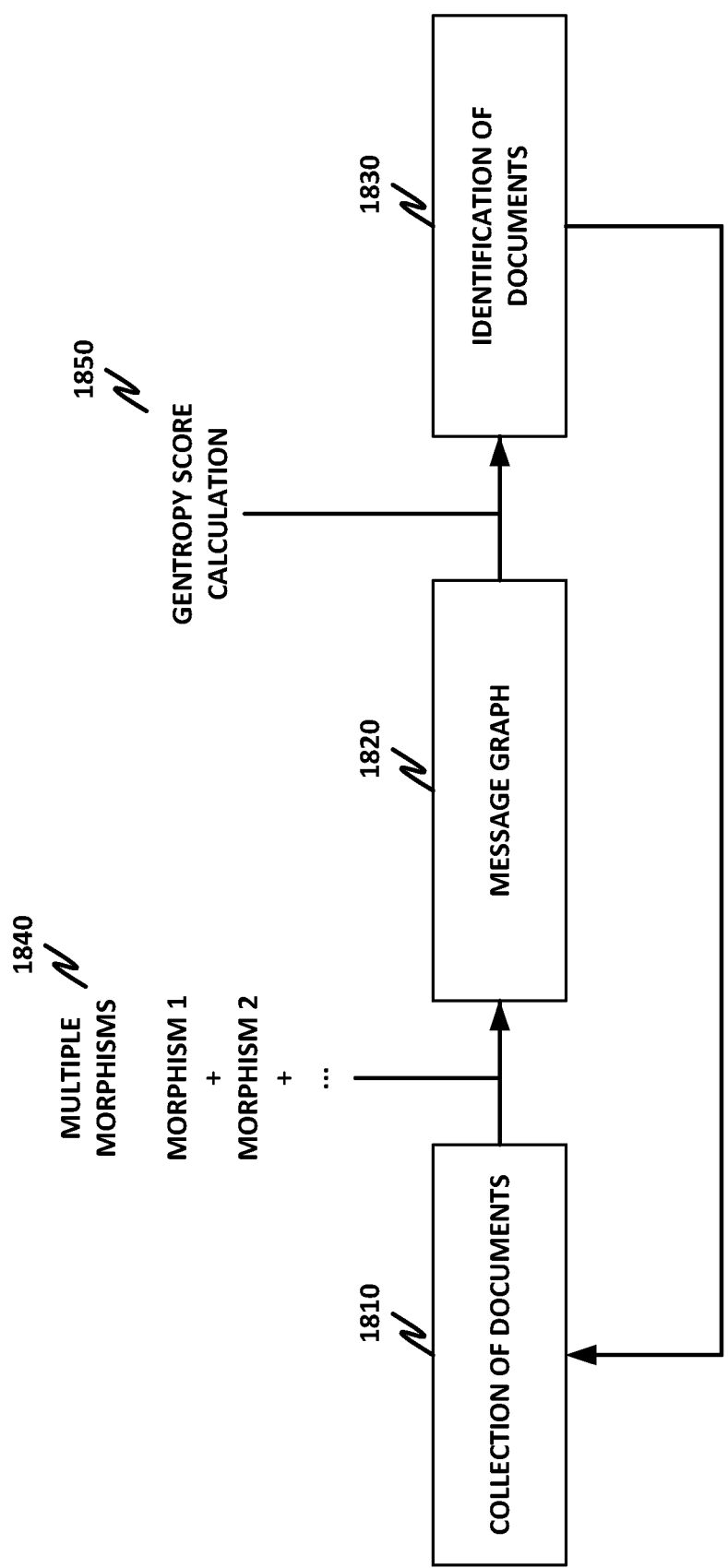
FIG. 18 is a block diagram of a classification process according to one or more examples of the present specification.

FIG. 18 is a block diagram of the classification of documents according to one or more examples of the present specification. As this FIGURE illustrates, starting with a collection of documents 1810, a plurality of morphisms 1840 is used to build a message graph 1820 with different kinds of edges corresponding to the relationships between different kinds of attributes. This message graph might represent knowledge space when the documents are patents. The gentropy score is calculated as described before and used for identification of interesting documents 1830. The documents identified as interesting become a new collection of documents 1810 and further refinement is possible.

Figure 19:
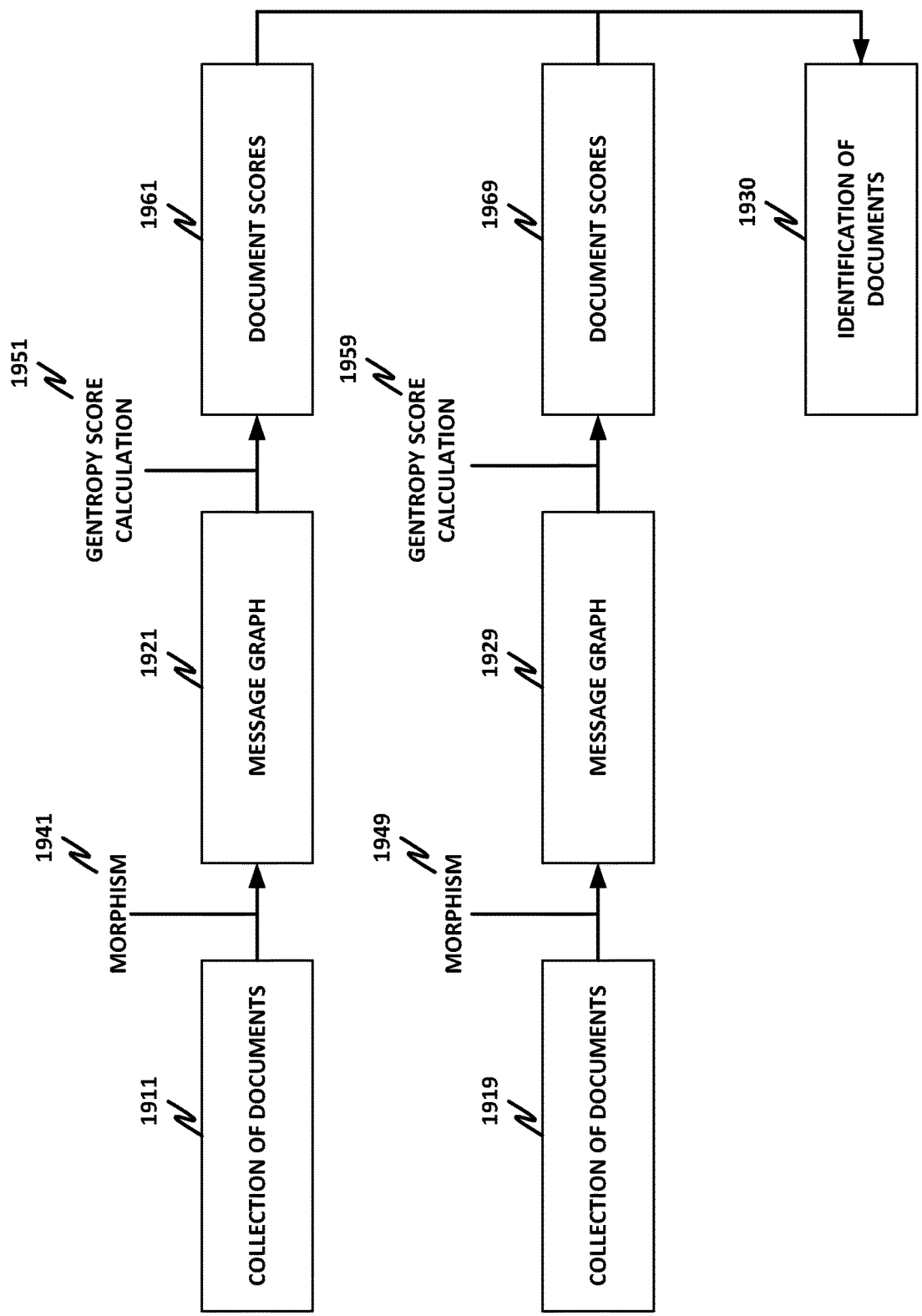
FIG. 19 is a block diagram of a classification process according to one or more examples of the present specification.

FIG. 19 is a block diagram of application of the classification of documents according to one or more examples of the present specification. As this FIGURE illustrates, starting with two or more collections of document, e.g. 1911, 1919, which might or might not contain the same documents, one or more morphisms, e.g., 1941, 1940, which might or might not be the same, are used to build a message graph for each collection, e.g., 1921, 1929. The message graph of each collection might or might not contain different kinds of edges. The nodes and edges of the message graphs convey relationships between different attributes of the documents. The gentropy score is calculated as described before for each collection of items and can be used for identification of interesting documents. The gentropy scores according to different morphisms can be recorded, e.g., 1961, 1969, and machine learning algorithms can be then be applied for identification of interesting documents 1930.

Figure 20:
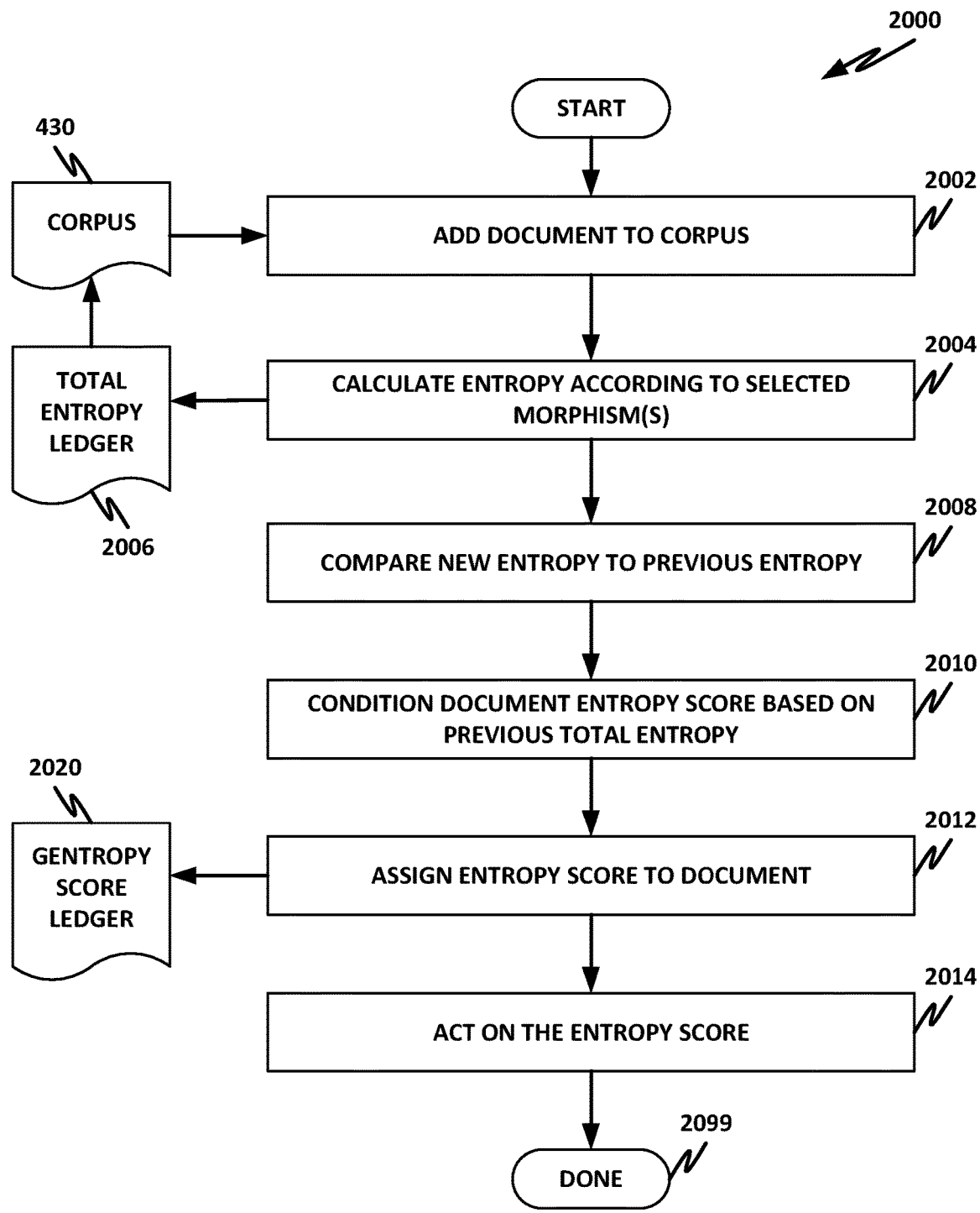
FIG. 20 is a flow chart of a method of computing and applying gentropy scores according to one or more examples of the present specification.

FIG. 20 is a flow chart of a method 2000 of computing and applying entropy according to one or more examples of the present specification.

In block 2002, a document is added to corpus 430 and state n is created. Corpus 430 in state n−1 already has an existing total information entropy $H_{n-1}$ stored in total entropy ledger 2006. This is true even if corpus 430 starts out as an empty corpus, with an information entropy of zero.

In block 2004, the message graph of corpus 430 in the state n is built by the application of one or more morphisms to the documents of the corpus or their attributes and the information entropy of corpus 430 in the state n, ($H_n$) is calculated. This is stored in ledger 2006.

In block 2108, the information entropy of the message graph of corpus 430 in state n is compared to the information entropy of message graph of the corpus 430 in state n−1 to calculate a value for $S_d$, the information entropy contribution of the present message (document), also referred to as the gentropy.

In block 2010, $S_d$ may be conditioned or otherwise adjusted based on an appropriate function, functional, or set of instructions. In a nonlimiting example, $S_d$ is multiplied by the number of documents in the corpus. In another nonlimiting example, the conditioned quantity is the exponentiation of the number of documents as the exponent and Euler's number as the base. In yet another nonlimiting example, the conditioned quantity is the number of documents times the inverse of the exponentiation of the difference in the number of documents between the initial state and the current state times a constant and Euler's constant as the base. The conditioned quantity is the gentropy score $G_d$. As described above, this is to ensure that $G_d$ is not unfairly penalized simply because corpus 430 has grown relatively large, and that $G_d$ is not unfairly inflated simply because corpus 430 is relatively small, but it can serve other purposes as well.

In block 2012, a conditioned incremental entropy score, $G_d$ is assigned to the document under consideration and stored in ledger 2020 for reference. Depending on the application, the magnitude of this entropy score may indicate whether the document is of particular interest. For example, in a web search, a low $G_d$ may indicate a particularly relevant search result. In a security application, a high $G_d$ may indicate a particularly interesting event.

In block 2014, the system acts on the gentropy score $G_d$. This could be any of a large number of potential actions. For example, in a search engine for web pages or scientific publications, acting on the score could include returning "hits" for those documents in corpus 430 that have the lowest $G_d$. In a patent search, acting on the score could include returning "hits" for documents that have both the highest and lowest values for $G_d$, meaning that they may be of the greatest interest to subject matter experts. In a security application, acting on the score may include alerting a security administrator 150 that an event with a particularly high entropy has occurred, thus giving security administrator 150 an opportunity to take appropriate action. In appropriate circumstances, many other species of acting on the score are possible.

In block 2099, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example, a computing apparatus for assigning a gentropy score to a document to be added to a corpus in a first temporal state having a first corpus information entropy, comprising: one or more logic elements, including at least one hardware logic element, comprising a classification engine to: receive the document to be added to the corpus; add the document to the corpus, creating a second temporal state of the corpus; compute a second corpus entropy for the second temporal state, based at least in part on a morphism; and assign the document a gentropy score based at least in part on a difference between the first corpus entropy and the second corpus entropy.

There is further disclosed an example, wherein assigning the document a gentropy score comprises conditioning the gentropy score based at least in part on a function or functional of a number of documents in the corpus in the first temporal state.

There is further disclosed an example, wherein computing the second corpus entropy comprises computing an entropy of a message graph of the form $H(X)=-\Sigma_i P(x_i) \log_2 P(x_i)$.

There is further disclosed an example, wherein computing the second corpus entropy is based at least in part on a plurality of morphisms.

There is further disclosed an example, wherein the classification engine is further to add a second document to the corpus, and compute a gentropy score for the second document.

There is further disclosed an example, wherein the classification engine is further to act on the gentropy score.

There is further disclosed an example, wherein the corpus comprises patents, and wherein acting on the gentropy score comprises determining that the gentropy score falls within a range designated a region of interest, and identifying the document as a patent of interest.

There is further disclosed an example, wherein the corpus comprises network resources, and wherein acting on the gentropy score comprises determining that the gentropy score is higher than a threshold, and marking the document as suspicious.

There is further disclosed an example, wherein the corpus comprises employee or contract diversity data, and wherein acting on the gentropy score comprises determining that a hiring or contracting decision with a high entropy represents a hiring of or contracting with a person or enterprise with high diversity.

There is further disclosed in an example, one or more tangible, non-transitory, computer-readable storage mediums for instructing a processor to provide a classification engine for assigning a gentropy score to a document to be added to a corpus in a first temporal state having a first corpus information entropy, the classification engine to: receive the document to be added to the corpus; add the document to the corpus, creating a second temporal state of the corpus; compute a second corpus entropy for the second temporal state, based at least in part on a morphism; and assign the document a gentropy score based at least in part on a difference between the first corpus entropy and the second corpus entropy.

There is further disclosed an example, wherein assigning the document a gentropy score comprises conditioning the gentropy score based at least in part on a function or functional of a number of documents in the corpus in the first temporal state.

There is further disclosed an example, wherein computing the second corpus entropy comprises computing an entropy of a message graph of the form $H(X)=-\Sigma_i P(x_i) \log_2 P(x_i)$.

There is further disclosed an example, wherein computing the second corpus entropy is based at least in part on a plurality of morphisms.

There is further disclosed an example, wherein the classification engine is further to add a second document to the corpus, and compute a gentropy score for the second document.

There is further disclosed an example, wherein the classification engine is further to act on the gentropy score.

There is further disclosed an example, wherein the corpus comprises patents, and wherein acting on the gentropy score comprises determining that the gentropy score falls within a range designated a region of interest, and identifying the document as a patent of interest.

There is further disclosed an example, wherein the corpus comprises network resources, and wherein acting on the gentropy score comprises determining that the gentropy score is higher than a threshold, and marking the document as suspicious.

There is further disclosed an example, wherein the corpus comprises employee or contract diversity data, and wherein acting on the gentropy score comprises determining that a hiring or contracting decision with a high entropy represents a hiring of or contracting with a person or enterprise with high diversity.

A method of assigning a gentropy score to a document to be added to a corpus in a first temporal state having a first corpus information entropy, comprising: receiving the document to be added to the corpus; adding the document to the corpus, creating a second temporal state of the corpus; computing a second corpus entropy for the second temporal state, based at least in part on a morphism; and assigning the document a gentropy score based at least in part on a difference between the first corpus entropy and the second corpus entropy.

There is further disclosed an example, wherein assigning the document a gentropy score comprises conditioning the gentropy score based at least in part on a function or functional of a number of documents in the corpus in the first temporal state.

There is further disclosed an example, wherein computing the second corpus gentropy comprises computing an entropy of a message graph of the form $(H(X)=-\Sigma_i P(x_i) \log_2 P(x_i)$.

There is further disclosed an example, wherein computing the second corpus entropy is based on a plurality of morphisms.

There is further disclosed an example, wherein the classification engine is further to add a second document to the corpus, and compute a gentropy score for the second document.

There is further disclosed an example, wherein the classification engine is further to act on the gentropy score.

There is further disclosed an example, wherein the corpus comprises patents, and wherein acting on the gentropy score comprises determining that the gentropy score falls within a range designated a region of interest, and identifying the document as a patent of interest.

There is further disclosed in an example, a computing apparatus for assigning a gentropy score to a document to be added to a corpus in a first temporal state having a first corpus information entropy, comprising: one or more logic elements, including at least one hardware logic element, comprising a classification engine to: receive the document to be added to the corpus; create a message graph of the first corpus using at least a first morphism including a conditioning of weight of individual edges of the message graph; calculate a gentropy of the corpus in the first temporal state comprising calculating a first node occupation probability density function of the message graph; receiving the document to be added to the first corpus, creating a second temporal state of the corpus having a second corpus information entropy; create a message graph of the second temporal state using at least a second morphism including a conditioning of weight of individual edges of the message graph; calculate a second gentropy of the corpus in the second temporal state comprising calculating a second node occupation probability density function of the message graph; assigning the gentropy score to the document comprising computing a gentropy difference between the first gentropy and the second gentropy.

There is further disclosed an example, wherein the classification engine is further to apply machine learning techniques to classify the document according to the gentropy score.

There is further disclosed in an example, a method of assigning a gentropy score to a document to be added to a corpus in a first temporal state having a first corpus information entropy, comprising: receiving the document to be added to the corpus; creating a message graph of the first corpus using at least a first morphism including a conditioning of weight of individual edges of the message graph; calculating a gentropy of the corpus in the first temporal state comprising calculating a first node occupation probability density function of the message graph; receiving the document to be added to the first corpus, creating a second temporal state of the corpus having a second corpus information entropy; creating a message graph of the second temporal state using at least a second morphism including a conditioning of weight of individual edges of the message graph; calculating a second gentropy of the corpus in the second temporal state comprising calculating a second node occupation probability density function of the message graph; and assigning the gentropy score to the document comprising computing a gentropy difference between the first gentropy and the second gentropy.

There is further disclosed an example, wherein the classification engine is further to apply machine learning techniques to classify the document according to the gentropy score.

An apparatus comprising means for performing the method of any of the preceding examples.

There is further disclosed an example, wherein the means comprise a processor and a memory.

There is further disclosed an example, wherein the means comprise a machine readable medium having stored thereon executable instructions to instruct a processor to perform the method.

There is further disclosed an example, wherein the apparatus is a computing system.

There is further disclosed an example of one or more tangible, non-transitory computer-readable storage mediums having stored thereon executable instructions for instructing one or more processors for providing a classification engine operable for performing any or all of the operations of any of the preceding examples.

There is further disclosed an example of a method of providing a classification engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

The invention claimed is:

1. A computing apparatus for assigning a gentropy score to a document to be added to a corpus in a first temporal state having a first corpus information entropy, comprising:
one or more logic elements, including at least one hardware logic element, comprising a classification engine to:
receive the document to be added to the corpus;
add the document to the corpus, creating a second temporal state of the corpus;
compute a second corpus entropy for the second temporal state, based at least in part on a morphism; and
assign the document a gentropy score based at least in part on a difference between the first corpus entropy and the second corpus entropy, wherein assigning the document a gentropy score comprises conditioning the gentropy score based on a number of documents in the corpus in the first temporal state.

2. The computing apparatus of claim 1, wherein computing the second corpus entropy comprises computing an entropy of a message graph of the form:
$H(X) = -\Sigma_i P(x_i) \log_2 P(x_i)$.

3. The computing apparatus of claim 1, wherein computing the second corpus entropy is based at least in part on a plurality of morphisms.

4. The computing apparatus of claim 1, wherein the classification engine is further to add a second document to the corpus, and compute a gentropy score for the second document.

5. The computing apparatus of claim 1, wherein the classification engine is further to act on the gentropy score.

6. The computing apparatus of claim 5, wherein the corpus comprises patents, and wherein acting on the gentropy score comprises determining that the gentropy score falls within a range designated a region of interest, and identifying the document as a patent of interest.

7. The computing apparatus of claim 5, wherein the corpus comprises network resources, and wherein acting on the gentropy score comprises determining that the gentropy score is higher than a threshold, and marking the document as suspicious.

8. The computing apparatus of claim 5, wherein the corpus comprises employee or contract diversity data, and wherein acting on the gentropy score comprises determining that a hiring or contracting decision with a high entropy represents a hiring of or contracting with a person or enterprise with high diversity.

9. One or more tangible, non-transitory, computer-readable storage mediums for instructing a processor to provide a classification engine for assigning a gentropy score to a document to be added to a corpus in a first temporal state having a first corpus information entropy, the classification engine to:
  receive the document to be added to the corpus;
  add the document to the corpus, creating a second temporal state of the corpus;
  compute a second corpus entropy for the second temporal state, based at least in part on a morphism; and
  assign the document a gentropy score based at least in part on a difference between the first corpus entropy and the second corpus entropy, wherein assigning the document a gentropy score comprises conditioning the gentropy score based on a number of documents in the corpus in the first temporal state.

10. The one or more tangible, non-transitory computer-readable storage mediums of claim 9, wherein computing the second corpus entropy comprises computing an entropy of a message graph of the form $H(X) = -\Sigma_i P(x_i) \log_2 P(x_i)$.

11. The one or more tangible, non-transitory computer-readable storage mediums of claim 9, wherein computing the second corpus entropy is based at least in part on a plurality of morphisms.

12. The one or more tangible, non-transitory computer-readable storage mediums of claim 9, wherein the classification engine is further to add a second document to the corpus, and compute a gentropy score for the second document.

13. The one or more tangible, non-transitory computer-readable storage mediums of claim 9, wherein the classification engine is further to act on the gentropy score.

14. The one or more tangible, non-transitory computer-readable storage mediums of claim 13, wherein the corpus comprises patents, and wherein acting on the gentropy score comprises determining that the gentropy score falls within a range designated a region of interest, and identifying the document as a patent of interest.

15. The one or more tangible, non-transitory computer-readable storage mediums of claim 13, wherein the corpus comprises network resources, and wherein acting on the gentropy score comprises determining that the gentropy score is higher than a threshold, and marking the document as suspicious.

16. The one or more tangible, non-transitory computer-readable storage mediums of claim 13, wherein the corpus comprises employee or contract diversity data, and wherein acting on the gentropy score comprises determining that a hiring or contracting decision with a high entropy represents a hiring of or contracting with a person or enterprise with high diversity.

17. A method of assigning a gentropy score to a document to be added to a corpus in a first temporal state having a first corpus information entropy, comprising:
  receiving the document to be added to the corpus;
  adding the document to the corpus, creating a second temporal state of the corpus;
  computing a second corpus entropy for the second temporal state, based at least in part on a morphism; and
  assigning the document a gentropy score based at least in part on a difference between the first corpus entropy and the second corpus entropy, wherein assigning the document a gentropy score comprises conditioning the gentropy score based on a number of documents in the corpus in the first temporal state.

18. The method of claim 17, wherein computing the second corpus entropy comprises computing an entropy of a message graph of the form $H(X) = -\Sigma_i P(x_i) \log_2 P(x_i)$.

19. The method of claim 17, wherein computing the second corpus entropy is based at least in part on a plurality of morphisms.

20. The method of claim 17, further comprising adding a second document to the corpus, and compute a gentropy score for the second document.

21. The method of claim 17, wherein the classification engine is further to act on the gentropy score.

22. The method of claim 21, wherein the corpus comprises patents, and wherein acting on the gentropy score comprises determining that the gentropy score falls within a range designated a region of interest, and identifying the document as a patent of interest.

* * * * *